United States Patent
Fukui et al.

(10) Patent No.: US 10,472,511 B2
(45) Date of Patent: Nov. 12, 2019

(54) FLUOROPOLYMER/FLUORINE-CONTAINING ORGANOPOLYSILOXANE COMPOSITE MATERIAL, METHOD FOR PRODUCING SAME, USE OF SAME, AND PRECURSOR COMPOSITION USED IN SAID PRODUCTION METHOD

(71) Applicant: Dow Corning Toray Co., Ltd., Tokyo (JP)

(72) Inventors: Hiroshi Fukui, Chiba (JP); Takuya Ogawa, Chiba (JP)

(73) Assignee: DOW TORAY CO., LTD., Tokyo (JP)

( * ) Notice: Subject to any disclaimer, the term of this patent is extended or adjusted under 35 U.S.C. 154(b) by 160 days.

(21) Appl. No.: 15/506,812

(22) PCT Filed: Aug. 26, 2015

(86) PCT No.: PCT/JP2015/004283
§ 371 (c)(1),
(2) Date: Apr. 27, 2017

(87) PCT Pub. No.: WO2016/031242
PCT Pub. Date: Mar. 3, 2016

(65) Prior Publication Data
US 2017/0260383 A1 Sep. 14, 2017

(30) Foreign Application Priority Data
Aug. 29, 2014 (JP) .................. 2014-176228

(51) Int. Cl.
*C08L 27/20* (2006.01)
*C08G 77/12* (2006.01)
*C08G 77/20* (2006.01)

(52) U.S. Cl.
CPC .............. *C08L 27/20* (2013.01); *C08G 77/12* (2013.01); *C08G 77/20* (2013.01); *C08L 2201/10* (2013.01); *C08L 2203/20* (2013.01)

(58) Field of Classification Search
CPC .......... C08L 27/20; C08G 77/12; C08G 77/20
USPC ....................................................... 524/506
See application file for complete search history.

(56) References Cited

U.S. PATENT DOCUMENTS

| | | |
|---|---|---|
| 5,132,366 A | 7/1992 | Kashida et al. |
| 6,015,858 A | 1/2000 | Gornowicz |
| 7,193,015 B1 | 3/2007 | Mabry et al. |
| 7,553,904 B2 | 6/2009 | Lichtenhan et al. |
| 2007/0069187 A1 | 3/2007 | Tonge |
| 2009/0076224 A1 | 3/2009 | Kishine et al. |
| 2010/0093951 A1* | 4/2010 | Oikawa ............... C08F 283/12 525/474 |
| 2011/0082271 A1 | 4/2011 | Brinati et al. |
| 2013/0296512 A1 | 11/2013 | Marrani et al. |
| 2014/0117272 A1 | 5/2014 | Yu et al. |

FOREIGN PATENT DOCUMENTS

| | | |
|---|---|---|
| CN | 1374984 A | 10/2002 |
| EP | 0330200 A1 | 8/1989 |
| JP | H01215847 A | 8/1989 |
| JP | H02199172 A | 8/1990 |
| JP | H06342947 A | 12/1994 |
| JP | 2007514055 A | 5/2007 |
| JP | 2008297528 A | 12/2008 |
| JP | 2010108490 A | 5/2010 |
| JP | 2011522096 A | 7/2011 |
| JP | 2011222679 A | 11/2011 |
| JP | 2014505134 A | 2/2014 |
| WO | WO2007105754 A1 | 9/2007 |

OTHER PUBLICATIONS

PCT/JP2015/004283 International Search Report dated Nov. 10, 2015, 5 pages.
English language abstract and machine translation for JPH06342947 (A) extracted from http://worldwide.espacenet.com database on May 4, 2017, 15 pages.
English language abstract and machine translation for JP2008297528 (A) extracted from http://worldwide.espacenet.com database on May 4, 2017, 18 pages.
English language abstract and machine translation for JP2010108490 (A) extracted from http://worldwide.espacenet.com database on May 3, 2017, 39 pages.
English language abstract and machine translation for JP2011222679 (A) extracted from http://worldwide.espacenet.com database on May 3, 2017, 19 pages.

* cited by examiner

*Primary Examiner* — Deve V Hall
(74) *Attorney, Agent, or Firm* — Warner Norcross + Judd LLP

(57) ABSTRACT

Provided are a novel composite material in which a fluoropolymer and a fluorine-containing organopolysiloxane are dispersed in a mutually inseparable state, a method for producing the same, use of the same, and a precursor composition. The fluoropolymer-fluorine-containing organopolysiloxane composite material comprises: (A) one or more fluoropolymers selected from the group comprising polyvinylidene fluoride and polyvinylidene fluoride copolymers; (B) an organopolysiloxane crosslinking reaction product having a fluorine atom-containing organic group, obtained by subjecting to a crosslinking reaction a reactive organopolysiloxane having a fluorine atom-containing organic group and one or more reactive functional groups in the molecule capable of crosslinking between molecules by the reaction of these reactive functional groups; and optionally (X) fillers and/or other additives besides component (A) and component (B). Components (A) and (B) are included such that the mass ratio ((A)/(B)) of component (A) and component (B) is in the range of from 99/1 to 60/40.

20 Claims, No Drawings

FLUOROPOLYMER/FLUORINE-CONTAINING ORGANOPOLYSILOXANE COMPOSITE MATERIAL, METHOD FOR PRODUCING SAME, USE OF SAME, AND PRECURSOR COMPOSITION USED IN SAID PRODUCTION METHOD

CROSS-REFERENCE TO RELATED APPLICATIONS

This application is the National Stage of International Application No. PCT/JP2015/004283 filed on 26 Aug. 2015, which claims priority to and all advantages of Japanese Patent Application No. 2014-176228 filed on 29 Aug. 2014, the content of which is hereby incorporated by reference.

TECHNICAL FIELD

The present invention relates to a composite material containing a fluorine-containing organopolysiloxane crosslinking reaction product and one type or more of a fluoropolymer selected from a group made from fluoropolymer and polyvinylidene fluoride and polyvinylidene fluoride type copolymer in particular, a production method, an application, and a curable fluorine-containing organopolysiloxane composition using the production method. The present application claims priority based on Japanese patent application 2014-176228 filed in Japan on Aug. 29, 2014, and the content is cited herein.

BACKGROUND ART

Polyvinylidene fluoride and polyvinylidene fluoride type copolymers are known to be used as piezoelectric materials and pyroelectric materials. For example, Japanese Unexamined Patent Application 2010-108490 mentions a transparent piezoelectric sheet containing a vinylidene fluoride-tetrafluoroethylene copolymer, and also mentions using this sheet as a touch panel. Furthermore, Japanese Unexamined Patent Application 2011-222679 discloses a vinylidene fluoride-tetrafluoroethylene copolymer, a vinylidene fluoride-trifluorethylene copolymer, and use of polyvinylidene fluoride as a transparent piezoelectric film material for a transparent piezoelectric.

On the other hand, a method in which polyhedral oligomeric silsesquioxane (POSS) synthesized in advance or polyhedral oligomeric silicate is added to a fluoropolymer is known as a method for improving thermal properties and mechanical properties of fluoropolymers such as polyvinylidene fluoride or the like. Furthermore, a composite material provided by blending fluorinated POSS in polyvinylidene fluoride using a twin screw extruder is known (U.S. Pat. No. 7,193,015).

Furthermore, a method that crosslinks a vinyl group-containing polyhedral oligomeric silsesquioxane by a hydrosilylation reaction using a crosslinking agent having a silicon atom bonded hydrogen atom for a fluoropolymer blended with a vinyl group-containing polyhedral oligomeric silsesquioxane, and a composite material obtained using the method are known. Furthermore, it is known that the alkyl group of the polyhedral oligomeric silsesquioxane (POSS) can contain a fluorinated group (U.S. Pat. No. 7,553,904).

Furthermore, a piezoelectric polymer blend containing a piezoelectric polymer and a matrix polymer is also known (U.S. Patent Application No. 2014/0117272). In this application, polyvinylidene fluoride, polyvinylidene fluorine-trifluoroethylene, and the like in addition to poly (γ-benzyl-α, L-glutamate) are mentioned as the piezoelectric polymer, and polymethyl methacrylate, polyethylene, polyvinyl chloride, poly (1-butene), silicone elastomer, silicone rubber, and the like are mentioned as the matrix polymer. However, a polymer blend in which polyvinylidene fluoride is combined with organopolysiloxane having a fluorine-containing organic group is not mentioned. Furthermore, there is no mention or suggestion for a substantially transparent composite material made by dispersing fluoropolymers such as polyvinylidene fluoride or the like with an organopolysiloxane crosslinking reaction product having a fluorine-containing organic group in an integral and mutually inseparable condition.

CITATION LIST

Patent Literature

Patent Document 1: Japanese Unexamined Patent Application 2010-108490
Patent Document 2: Japanese Unexamined Patent Application 2011-222679
Patent Document 3: U.S. Pat. No. 7,193,015
Patent Document 4: U.S. Pat. No. 7,553,904
Patent Document 5: U.S. Patent Application Publication No. 2014/0117272
Patent Document 6: Japanese Unexamined Patent Application H6-342947

SUMMARY OF INVENTION

Technical Problem

The new composite material that preferably has high transparency and favorable processability for manufacturing moldings such as film or the like and a production method thereof are needed in order to design a material having desirable properties without greatly impairing the piezoelectric properties of the fluoropolymer such as polyvinylidene fluoride, polyvinylidene fluoride copolymer, and the like. In particular, uniformly conjugating the fluoropolymer with a organopolysiloxane crosslinking reaction product such as siloxane elastomer or the like is difficult, and in particular, providing a composite material where these different types of polymers are integrally uniformly or gradationally dispersed and which has favorable processability and favorable mechanical strength as well as favorable optical transparency is strongly demanded in the fields of electronic materials and electronic members for display devices.

Solution to Problem

The present invention provides a novel composite material that can improve the physical properties had by a single fluoropolymer without significantly changing characteristics such as the crystallinity of the fluoropolymer, the melting point of the fluoropolymer, and the like, by combining and compositing a fluoropolymer selected from polyvinylidene fluoride and polyvinylidene fluoride copolymer, and a crosslinking or curable fluorine-containing organopolysiloxane, and also provides a production method thereof, a use thereof, and a precursor composition using the production method.

A fluoropolymer/fluorine-containing organopolysiloxane composite material of the present invention comprises (A) one or more fluoropolymers selected from a group consisting of polyvinylidene fluoride and polyvinylidene fluoride-based copolymer;

(B) an organopolysiloxane cross-linked reaction product having a fluorine atom-containing organic group, which is formed by means of a cross-linking reaction of a reactive organopolysiloxane where the reactive organopolysiloxane has, in the molecule, a fluorine atom-containing organic group(s) and one or more types of reactive functional groups, and are capable of intermolecular-crosslinking by the reaction of the reactive functional groups; and optionally, (X) a filler or an additive other than component (A) and component (B);

wherein the composite material comprises component (A) and component (B) in a ratio ((A)/(B)) by weight of from 99/1 to 60/40, and wherein a light transmittance at 450 nm of a sample in the form of a film with thickness of 70 μm, where the sample comprises only component (A) and component (B) and does not comprise the optional component (X), is 80% or more when a light transmittance at 450 nm for air is defined as 100%.

In the aforementioned composite material, preferably component (A) and component (B) are uniformly dispersed or gradationally dispersed over the entirety of the composite material such that one cannot be separated from the other. Incidentally, the term "gradationally dispersed" used herein means that component (A) and component (B) are mutually integrated to a degree that cannot be separated, and the concentration of each component gradually changes in any direction of the composite material (when in the form of a film, in either the planar direction, or in the cross-section direction). On the other hand, uniformly dispersed means that component (A) and component (B) are mutually integrated to a degree that cannot be separated, and the concentration of each component is uniform across the entire material.

With the aforementioned composite material, preferably the component (B) is a cross-linked reaction product formed by conducting a cross-linking reaction of an organopolysiloxane composition which is cross-linkable by means of a hydrosilylation reaction, where the organopolysiloxane composition comprises organopolysiloxane containing alkenyl groups (B1), organopolysiloxane containing silicon atom-bonded hydrogen atoms (B2), and a hydrosilylation catalyst. Incidentally, at least one, or both of the aforementioned components (B1) and (B2) are organopolysiloxanes with a fluorine atom-containing functional group, but it is particularly preferable if both components (B1) and (B2) are organopolysiloxanes with a fluorine atom-containing organic functional group, from the perspective of improving the transparency of the composite material obtained.

With the aforementioned composite material, in component (B), 10 to 90 mol % of all of the functional groups of the organopolysiloxane cross-linked reaction products obtained by reacting component (B1) and component (B2) are preferably fluorine atom-containing organic groups, and particularly preferably, the fluorine atom -containing organic groups are fluoroalkyl groups.

With the aforementioned composite material, preferably the difference ($\Delta T$) between a crystal-melt peak temperature ($T_{hyb}$) of the composite material, which is measured by using a differential scanning calorimetry, and a crystal-melt peak temperature ($T_A$) of the component (A) alone measured by using the same method is within the range of $\pm 5°$ C.

The shape of the aforementioned composite material is not particularly restricted, and any shape is acceptable, but a film shape is also acceptable. In particular, the production method of the composite material described below is it preferable method for producing a film shaped composite material, and can provide a composite material with a film shape of a desired thickness. A composite material with a film shape is suitable for use as an electronic material or a member for a display device, and in particular as a member for a display panel or a display.

The composite material of the present invention can be suitably produced using a precursor composition of a fluorine-containing organic polymer and a fluorine-containing organopolysiloxane composite material; comprising:

(A) one or more fluoropolymers selected from a group consisting of polyvinylidene fluoride and polyvinylidene fluoride-based copolymer;

(B') an organopolysiloxane composition capable of cross-linking reaction, comprising a reactive organopolysiloxane which has, in the molecule, a fluorine-containing organic group(s) and one or more types of reactive functional groups, and are capable of intermolecular-crosslinking by the reaction of the reactive functional groups;

(C) an organic solvent which is capable of solubilizing at least a part of or the entirety of each of a component (A) and a component (B'); and optionally (X) a filler or an additive other than component (A) and component (B'); wherein the precursor composition comprises the component (A) and the component (B') in such a ratio that the ratio ((A)/(B)) by weight of the component (A) and the organopolysiloxane cross-linked reaction product (B) formed by conducting a cross-linking reaction of the component (B') is within the range of from 99/1 to 60/40; and the precursor composition is included within the scope of the present invention.

With the precursor composition, an amount of the component (C) is within the range of from 25 to 3,000 parts by weight relative to 100 parts by weight of the sum of component (A) and component (B').

A method for producing the fluoropolymer/fluorine-containing organopolysiloxane of the present invention includes the following steps (1) and (2):

(1) a step of mixing (A) one or more fluoropolymers selected from the group consisting of polyvinylidene fluoride and polyvinylidene fluoride-based copolymer;

(B') an organopolysiloxane composition capable of cross-linking reaction, including a reactive organopolysiloxane which has, in the molecule, a fluorine atom-containing organic group(s) and one or more types of reactive functional groups, and are capable of intermolecular-crosslinking by the reaction of the reactive functional groups; and (C) an organic solvent which is capable of solubilizing at least a part of or the entirety of each of component (A) and component (B'); in such a ratio that the ratio ((A)/(B)) by weight of the component (A) and an organopolysiloxane cross-linked reaction product (B) formed by conducting a cross-linking reaction of component (B') is within the range of from 99/1 to 60/40; and (2) a step of removing at least a part of or the entirety of the organic solvent together with or after reacting the reactive functional groups of component (B') in the mixture prepared in step (1) to form an organopolysiloxane cross-linked reaction product (B) which has fluorine atom-containing organic groups in the molecule.

With the aforementioned production method, the organopolysiloxane composition capable of cross-linking reaction includes (B1) an organopolysiloxane having an alkenyl group and (B2) an organopolysiloxane having a silicon atom bonded hydrogen atom; and at least one or both of component (B1) and component (B2) are an organopolysiloxane having a fluorine atom-containing organic group, and the composition preferably contains a hydrosilylation reaction catalyst, and more preferably, both components (B1) and (B2) are organopolysiloxanes having a fluorine atom-containing organic group.

With the aforementioned production method, the organic solvent is not particularly restricted, but is preferably one or more polar solvents selected from N,N-dimethylformamide, N,N-dimethylacetamide, N-methyl-2-pyrrolidone, 1,3-dimethylimidazolidinone, dimethylsulfoxide, hexamethylphosphate triamide, tetramethylurea, triethylphosphate, and trimethylphosphate.

With the aforementioned production method, the step (1) may be a step where (X) a filler or an additive other than component (A) and (B') is further mixed in addition to components (A), (B'), and (C). Incidentally, with the composite material of the present invention or the production method thereof, the use of component (X) is optional, and component (X) may or may not be used In other words, the composite material of the present invention may be a composite material that substantially contains only component (A) and component (B), but in order to improve the function and properties, a configuration is possible where component (X) is further dispersed in a matrix of a composite material containing component (A) and component (B).

With the aforementioned production method, an amount of the component (C) used is within the range of from 25 to 3,000 parts by weight relative to 100 parts by weight of the sum of component (A) and component (B').

The application for the composite material of the present invention, the precursor composition of the present invention, and composite material obtained using the production method of the present invention is not particularly restricted, but may be an electronic material or a component of a display device.

An electric component or a display device including the composite material of the present invention is included as a preferable aspect of the present invention.

In particular, a display panel or display that includes the composite material of the present invention in a film form is included as a preferable aspect of the present invention. Incidentally, the display panel or display described herein includes so-called touch panels where an apparatus can be operated by touching the screen.

The production method for a different form of the fluoropolymer/fluorine-containing organopolysiloxane composite material includes a step of cross-link reacting of a cross-linkable organopolysiloxane composition (B') containing a reactive organopolysiloxane, which contains one or more types of reactive functional groups in the molecule in the presence of one or more types of fluoropolymers (A) selected from a group of polyvinylidene fluoride and polyvinylidene fluoride copolymers, and can crosslink between molecules by the reaction of the reactive functional groups. This form of method does not require an organic solvent.

With this different form of production method, the reactive functional groups are a combination where a hydrosilylation reaction is possible between an alkenyl group and a silicon atom bonded hydrogen atom, and the organopolysiloxane composition (B') that can undergo a cross-linking reaction preferably contains a hydrosilylation reaction catalyst.

DESCRIPTION OF EMBODIMENTS

The composite material, the precursor composition, and the precursor raw material used in the production method are described below.

[Component (A): Fluoropolymer]

The fluoropolymer that can be used in the present invention is combined with one or more types of polymers selected from a group consisting of polyvinylidene fluoride and polyvinylidene fluoride type copolymer. Polyvinylidene fluoride is a homopolymer of vinylidene fluoride, and is a known fluoropolymer. Polyvinylidene fluoride type copolymers include copolymers with vinylidene fluoride and other monomers. Examples of polyvinylidene fluoride type copolymers include vinylidene fluoride-tetrafluoroethylene copolymers, vinylidene fluoride-trifluoroethylene copolymers (refer to Japanese Unexamined Patent Application 2011-222679, Japanese Unexamined Patent Application 2011-522096, Japanese Unexamined Patent Application 2014-505134, and Japanese Unexamined Patent Application 2008-297528 regarding these kinds of copolymers), vinylidene fluoride-trifluoroethylene copolymers, vinylidene fluoride-chlorotrifluoroethylene copolymers, vinylidene fluoride-hexafluoropropylene copolymers (refer to Japanese Unexamined Patent Application H6-342947), and furthermore, terpolymers provided using a third comonomer in addition to vinylidene fluoride and the aforementioned comonomers can also be used, and examples include terpolymers made from vinylidene fluoride, tetrafluoroethylene, hexafluoropropylene, and chlorotrifluoroethylene (refer to Japanese Unexamined Patent Application 2008-297528). Furthermore, polyvinylidene fluoride copolymers provided by using monomers other than monomers mentioned here as comonomers are also within the range of polyvinylidene fluoride copolymers used in the present invention. Among these, particularly preferable vinylidene fluoride copolymers include copolymers selected from a group consisting of vinylidene fluoride-tetrafluoroethylene copolymers, vinylidene fluoride-trifluoroethylene copolymers, vinylidene fluoride-vinyl fluoride copolymers, vinylidene fluoride-chlorotrifluoroethylene copolymers, and vinylidene fluoride-hexafluoropropylene copolymers.

Among these, particularly preferable vinylidene fluoride copolymers include copolymers selected from a group consisting of vinylidene fluoride-tetrafluoroethylene copolymers, vinylidene fluoride-trifluoroethylene copolymers, vinylidene fluoride-vinyl fluoride copolymers, vinylidene fluoride-chlorotrifluoroethylene copolymers, and vinylidene fluoride-hexafluoropropylene copolymers.

[Component (B): Organopolysiloxane Crosslinking Reaction Product]

In the composite material of the present invention, the fluoropolymer (A) and the organopolysiloxane crosslinking reaction product (B) having a fluorine atom containing organic group in the molecule are conjugated in a mutually inseparable condition in which both components are mutually dispersed or one is dispersed in the other up to an extent in which the composite material made from only component (A) and component (B) without other components is optically transparent. With conventionally known polymer blending methods or the like, a uniform dispersion or gradation dispersion of component (A) and component (B) cannot be achieved, and the obtained composite materials will be in a phase separated condition or have an opaque appearance.

The organopolysiloxane crosslinking reaction product that can form the composite material is an organopolysiloxane crosslinking reaction product (B) that has a fluorine atom-containing organic group in the molecule, and is formed by crosslinking the reactive organopolysiloxane composition in between molecules. In particular, forming fluoropolymer-fluorine-containing organopolysiloxane composite material by crosslinking the reactive organopolysiloxane composition (B') in between molecules in the presence of the fluorine-containing copolymer (A) is preferable, the organopolysiloxane crosslinking reaction product (B) having the fluoropolymer (A) fluorine atom-containing organic group in the molecule is conjugated in a mutually inseparable condition by the formation of the composite material, and preferably, the composite material made only from component (A) and component (B) without other components is optically transparent.

Specifically, the organopolysiloxane crosslinking reaction product (B) that comprises the composite material of the present invention has a fluorine atom-containing organic group in the molecule and one type or more of the reactive functional group, and is an organopolysiloxane crosslinking reaction product that has a fluorine atom-containing organic group made by crosslink reacting reactive organopolysiloxane that can be crosslinked in between molecules from the reaction of the reactive functional group.

Examples of crosslinking reactions of reactive organopolysiloxane in between molecules include known reactions such as peroxide crosslinking, condensation reaction crosslinking, addition reaction crosslinking, ultraviolet crosslinking and the like, but any crosslinking method can be used as long as uncrosslinked organopolysiloxane can be crosslinked after mixing with fluoropolymers. However, using more crosslinkable reactive organopolysiloxane for addition reaction crosslinking is preferable, and in particular, using reactive organopolysiloxane crosslinkable by the hydrosilylation reaction is preferable.

The preferable organopolysiloxane crosslinking reaction product (B) is an organopolysiloxane crosslinking reaction product having a fluorine atom-containing organic group made by crosslink reacting the crosslinkable organopolysiloxane composition (B') using the hydrosilylation reaction made from organopolysiloxane (B1) having an alkyl group, organopolysiloxane (B2) having a silicone atom bonded hydrogen atom, and a hydrosilylation reaction catalyst. Here, at least one or both of component (B1) and component (B2) are organopolysiloxane having fluorine atom-containing organic groups. The following combinations 1 to 3 of component (B1) and component (B2) are particularly used without restrictions as more specific combinations. "Combination 3", or in other words, the organopolysiloxane in which component (B1) and component (B2) both have fluorine atom-containing organic groups are particularly preferable since dispersability of component (A) and component (B) and transparency of the composite material are excellent.

[Combination 1]

Component (B1) is an organopolysiloxane having on average at least 1 fluorine atom-containing organic group and at least 2 alkyl groups in the molecule, and component (B2) is an organohydrogen polysiloxane having on average at least 2 silicon atom bonded hydrogen atoms in one molecule that does not have a fluorine atom-containing organic group.

[Combination 2]

Component (B1) is an organopolysiloxane having on average at least 2 alkenyl groups in one molecule that does not have a fluorine atom-containing organic group, and component (B2) is an organohydrogen polysiloxane having on average at least 1 fluorine atom-containing organic group and at least 2 silicon atom bonded hydrogen atom s in 1 molecule.

[Combination 3]

Component (B1) is an organopolysiloxane having on average at least 1 fluorine atom-containing organic group and at least 2 alkyl groups in one molecule, and component (B2) is an organohydrogen polysiloxane having on average at least 1 fluorine atom-containing organic group and at least 2 silicon atom bonded hydrogen atoms in 1 molecule.

The fluorine atom-containing organic group contained in the organopolysiloxane crosslinking reaction product that comprises the composite material of the present invention specifically includes a group expressed using $C_nF_{2n+1}$—R—, $C_nF_{2n+1}$—R—O—R—, and $F(CF(CF_3)CF_2O)_nCF(CF_3)$—R—O—R— (in the formula, each R is independently a divalent hydrocarbon group, and n is an integer between 1 to 20). Examples of divalent hydrocarbon group R in the aforementioned formula include alkylene groups such as methylene groups, ethylene groups, methyl methylene groups, propylene groups, butylene groups and the like; arylene groups such as phenylene groups, tolylene groups, xylylene groups and the like; and alkylene arylene groups such as methyl phenylene groups, ethyl phenylene groups, and the like. Examples of fluorine atom-containing organic groups include fluoroalkyl groups, and in particular, a $CF_3CH_2CH_2$— group is preferable.

The amount of the fluorine atom-containing organic group of the organopolysiloxane is not particularly restricted, but having fluorine atom-containing organic groups in a range of 10 to 90 mol % of the organic group of the entire organopolysiloxane crosslinking reaction product is preferable, and 15 to 85 mol %, or 20 to 80 mol % is more preferable since dispersability in the fluoropolymer (A) in the provided composite material will be excellent and transparency of the obtained composite material will be favorable. Note, when the organopolysiloxane crosslinking reaction product (B) does not substantially contain the fluorine atom-containing organic group, the composite material of the present invention cannot be achieved even if using the production method described below.

[Component (B'): Crosslink Reaction Organopolysiloxane Composition]

An organopolysiloxane crosslinking reaction product which is component (B) is preferably formed by crosslinking the crosslink reactive organopolysiloxane composition (B') between molecules in the presence of fluoropolymer (A). The composition has the fluorine atom-containing organic group and one type or more reactive functional group, and is a composition that contains the reactive organopolysiloxane that can be crosslinked between molecules by the reaction of the reactive functional group, and as mentioned above, the crosslinking reaction of the reactive organopolysiloxane between molecules is not restricted in particular, but using crosslinkable organopolysiloxane using the hydrosilylation reaction is preferable.

If the crosslinking reactive organopolysiloxane composition of the present invention is a hydrosilylation reaction crosslinkable composition, the composition will contain component (B1), component (B2), and the hydrosilylation reaction catalyst. Note, as mentioned above, at least one or both of component (B1) and component (B2) have a fluorine atom-containing organic group, and there are no particular restrictions to the combinations, but both component (B1) and (B2) having the fluorine atom-containing organic group is preferable. Furthermore, examples of the fluorine atom-containing organic groups are described above.

[Component (B1): Organopolysiloxane Having an Alkenyl Group]

Component (B1) is an organopolysiloxane having an alkenyl group that can have a fluorine atom-containing organic group, and from the viewpoint of crosslinking reactivity, preferably is an organopolysiloxane having at least 2 alkenyl groups in 1 molecule. Note, the alkenyl group is a hydrosilylation reactive alkenyl group. Examples of alkenyl groups include vinyl groups, allyl groups, butenyl groups, pentenyl groups, hexenyl groups, heptenyl groups and the like, and a vinyl group is particularly preferable. Note, the fluorine atom-containing organic group of component (B1) was described above as the fluorine atom-containing organic group included in the organopolysiloxane crosslinking reaction product that comprises the composite material of the present invention.

Types of silicon atom bonded organic groups other than the fluorine atom-containing organic group and alkenyl groups in component (B1) are not restricted in particular, but specific examples of monovalent hydrocarbon groups include alkyl groups such as methyl groups, ethyl groups, propyl groups, butyl groups and the like; aryl groups such as phenyl groups, tolyl groups, xylyl groups and the like, and aralkyl groups and the like, such as benzyl groups, phenethyl groups, and the like. Silicon atom bonded organic groups other than fluorine atom-containing organic groups and alkenyl groups are groups selected from methyl groups and phenyl groups, and are preferably a methyl group, a phenyl group, or a combination thereof. Furthermore, in addition to the aforementioned groups, the organopolysiloxane of component (B1) can have a small amount of a hydroxyl group or an alkoxy group.

The molecular structure of component (B 1) is not restricted in particular, and can be any shape including linear-shaped, ring-shaped, resin-shaped, and partially branched resin-shaped, and can have T units (in other words, $XSiO_{3/2}$, X is a monovalent organic group (including the fluorine atom-containing organic group), hydroxyl group, or alkoxyl group), or Q units (in other words, $SiO_{4/2}$). Furthermore, the viscosity is not restricted in particular, and low viscosity liquid organopolysiloxane to high viscosity gum-like organopolysiloxane can be used. The viscosity of component (B1) at 25° measured using a B type viscometer in accordance with JISK 7117-1 is preferably in a range of 100 to 1,000,000 mPa·s due to ease of use.

In the present invention, component (B1) is an organopolysiloxane having the fluorine atom-containing organic group and the alkenyl group, and in particular, is an organopolysiloxane made from M units (in other words, $R^1_3SiO_{1/2}$), organopolysiloxane made from T units ($R^1SiO_{3/2}$), linear organopolysiloxane made from M units and D units ($R^1_2SiO_{2/2}$), and resin-like organopolysiloxane made from M units, D units, and T units or Q units. Examples of organopolysiloxane made from M units and T units include those where a portion or all of the M units have an alkenyl group such as a vinyl group, and those where all or a portion of the $R^1$ of the T units have a fluorine atom-containing organic group such as a 3,3,3-trifluoropropyl group. Examples of linear organopolysiloxane made from M units and D units include those where all or a portion of the $R^1$ of the M units of the molecular chain terminal are alkenyl groups such as a vinyl group, and all or a portion of $R^1$ of the D units are fluorine atom-containing organic groups such as a 3,3,3-trifluoropropyl group. Examples of organopolysiloxane made from M units, D units, and T units include those where all or a portion of the $R^1$ of M units are an alkenyl group such as a vinyl group, and all or a portion of the $R^1$ of the D units and T units are a fluorine atom-containing organic group, such as a 3,3,3-trifluoropropyl group.

The following formula is a particularly preferable molecular structure for component (B 1):

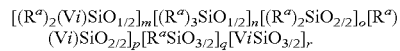

$[(R^a)_2(Vi)SiO_{1/2}]_m[(R^a)_3SiO_{1/2}]_n[(R^a)_2SiO_{2/2}]_o[R^a(Vi)SiO_{2/2}]_p[R^aSiO_{3/2}]_q[ViSiO_{3/2}]_r$

In the formula, each $R^a$ represents an independent group selected from a group consisting of the fluorine atom-containing organic group and the monovalent hydrocarbon group, and examples include groups similar to the aforementioned groups. Vi is an alkenyl group, and examples include alkenyl groups similar to those already mentioned. m, n, o, p, q, and r independently represent integers that are preferably selected such that the viscosity at 25° C. measured using a B type viscometer in accordance with JISK 7117-1 is preferably in a range of 100 to 1,000,000 mPa·s.

In the aforementioned formula, $R^a$ in M units (in other words, $(R^a)_2(Vi)SiO_{1/2}$ and $(R^a)_3SiO_{1/2}$) are independently an alkyl group, and in particular, a methyl group, or an aryl group, and in particular, a phenyl group. Furthermore, in the D units (in other words, $(R^a)_2SiO_{2/2}$ and $(R^a)(Vi)SiO_{2/2}$) and T units (in other words, $R^aSiO_{3/2}$), all or at least a portion of the $R^a$ is a fluorine atom-containing organic group.

Examples of (B1) include methyl (3, 3, 3-trifluoropropyl) polysiloxane in which both ends of the molecular chain are blocked by dimethylvinylsiloxy groups, (3,3,3-trifluoropropyl) siloxane-dimethylsiloxane copolymer in which both ends of the molecular chain are blocked by dimethylvinylsiloxy groups, (3,3,3-trifluoropropyl) siloxane-dimethylsiloxane-methylvinylsiloxane copolymer in which both ends of the molecular chain are blocked by dimethylvinylsiloxy groups, (3,3,3-trifluoropropyl) siloxane-methylvinylsiloxane copolymer in which both ends of the molecular chain are blocked by dimethylvinylsiloxy groups, methyl (perfluorobutylethyl) siloxane-dimethylsiloxane-methylvinylsiloxane copolymer in which both ends of the molecular chain are blocked by dimethylvinylsiloxy groups, methyl (perfluorohexyl ethyl) siloxane-dimethylsiloxane-methylvinylsiloxane copolymer in which both ends of the molecular chain are blocked by dimethylvinylsiloxy groups, (3,3,3-trifluoropropyl) siloxane-methylvinylsiloxane copolymer in which both ends of the molecular chain are blocked by trimethyldisiloxy groups, methyl (perfluoro butyl ethyl) siloxane-dimethylsiloxane-methylvinylsiloxane copolymer in which both ends of the molecular chain are blocked by trimethylsiloxy groups, methyl (perfluorohexyl ethyl) siloxane-dimethylsiloxane-methylvinylsiloxane copolymer in which both ends of the molecular chain are blocked by trimethylsiloxy groups, (perfluorobutylethyl) siloxane-dimethylsiloxane-methylhexenylsiloxane copolymer in which both ends of the molecular chain are blocked by dimethylvinylsiloxy groups, methyl (3,3,3-trifluoropropyl) siloxane-methylvinylsiloxane copolymer in which both ends of the molecular chain are blocked by silanol groups, methyl (3,3,3-trifluoropropyl) siloxane-dimethylsiloxane-methylvinylsiloxane copolymer in which both ends of the molecular chain are blocked by silanol groups, methyl (perfluorobutylethyl) siloxane-dimethylsiloxane-methylvinylsiloxane copolymer in which both ends of the molecular chain are blocked by silanol groups, methyl (perfluorohexyl ethyl) siloxane-dimethylsiloxane-methylvinylsiloxane copolymer in which both ends of the molecular chain are blocked by silanol groups, methyl (perfluoro butyl ethyl) siloxane-dimethylsiloxane-methylvinylsiloxane copolymer in which one end of the molecular chain is blocked with a silanol group and the other end is blocked with a trimethylsiloxy group, polysiloxane made from $(Me_3SiO_{1/2})$ units, $(Me_2ViSiO_{1/2})$ units, and (F3PSiO$_{3/2}$) units, polysiloxane made from $(Me_3SiO_{1/2})$ units, $(Me_2ViSiO_{1/2})$ units, $(PhSiO_{3/2})$ units, and $(F3PSiO_{3/2})$ units, polysiloxane made from $(Me_2ViSiO_{1/2})$ units, $(PhSiO_{3/2})$ units, and $(F3PSiO_{3/2})$ units, polysiloxane made from $(Me_2ViSiO_{1/2})$ units and $(F3PSiO_{3/2})$ units, polysiloxane made from $(Me_3SiO_{1/2}Me_3SiO_{1/2})$ units, $(Me_2ViSiO_{1/2})$ units, $(MeSiO_{3/2})$ units, and $(F3PSiO_{3/2})$ units, polysiloxane made from $(Me_2ViSiO_{1/2})$ units, $(MeSiO_{3/2})$ units, and $(F3PSiO_{3/2})$ units, polysiloxane made from $(Me_2ViSiO_{1/2})$ units, $(Me_2PhSiO_{1/2})$ units, $(MeSiO_{3/2})$ units, and (F3PSiO$_{3/2}$) units, polysiloxane made from $(Me_2ViSiO_{1/2})$ units, $(Me_2PhSiO_{1/2})$ units, $(PhSiO_{3/2})$ units, and $(F3PSiO_{3/2})$ units, polysiloxane made from $(Me_2ViSiO_{1/2})$ units, $(MeSiO_{3/2})$ units, $(PhSiO_{3/2})$ units, and $(F3PSiO_{3/2})$ units, polysiloxane made from $(Me_2ViSiO_{1/2})$ units, $(Me_2PhSiO_{1/2})$ units, and $(F3PSiO_{3/2})$ units, polysiloxane made from $(Me_2ViSiO_{1/2})$ units, $(Me_2SiO_{2/2})$ units, and $(F3PSiO_{3/2})$ units, polysiloxane made from $(Me_2ViSiO_{1/2})$ units, $(MePhSiO_{2/2})$ units, and $(F3PSiO_{3/2})$ units, polysiloxane made from $(Me_2ViSiO_{1/2})$ units, $(Me_2SiO_{2/2})$ units, $(PhSiO_{3/2})$ units, and $(F3PSiO_{3/2})$units, polysiloxane made from $(Me_2ViSiO_{1/2})$ units, $(MePhSiO_{2/2})$ units, $(PhSiO_{3/2})$ units, and $(F3PSiO_{3/2})$units, polysiloxane made from $(Me_2ViSiO_{1/2})$ units, $(Me_2SiO_{2/2})$ units, $(MeSiO_{3/2})$ units, and (F3PSiO$_{3/2}$)units, polysiloxane made from $(MePhViSiO_{1/2})$ units, $(Me_2SiO_{2/2})$ units, and $(F3PSiO_{3/2})$ units, polysiloxane made from $(MePhViSiO_{1/2})$ units, $(Me_2SiO_{2/2})$ units, $(PhSiO_{3/2})$ units, and $(F3PSiO_{3/2})$ units, polysiloxane made from $(MePhViSiO_{1/2})$ units, $(MePhSiO_{2/2})$ units, and $(F3PSiO_{3/2})$ units, polysiloxane made from $(MePhViSiO_{1/2})$ units, $(MePhSiO_{2/2})$ units, $(PhSiO_{3/2})$ units, and $(F3PSiO_{3/2})$ units, polysiloxane made from $(Me_2ViSiO_{1/2})$ units, $(MeF3PSiO_{2/2})$ units, and $(MeSiO_{3/2})$ units, polysiloxane made from $(Me_2ViSiO_{1/2})$ units, $(Me_2SiO_{2/2})$ units, $(MeF3PSiO_{2/2})$ units, and $(MeSiO_{3/2})$ units, polysiloxane made from $(Me_2ViSiO_{1/2})$ units, $(MeF3PSiO_{2/2})$ units, and $(PhSiO_{3/2})$ units, polysiloxane made from $(Me_2ViSiO_{1/2})$ units, $(Me_3SiO_{1/2})$ units, $(MeF3PSiO_{2/2})$ units, and $(MeSiO_{3/2})$ units, polysiloxane made from $(Me_2ViSiO_{1/2})$ units, $(Me_3SiO_{1/2})$ units, $(MeF3PSiO_{2/2})$ units, and $(PhSiO_{3/2})$ units, polysiloxane made from $(Me_2ViSiO_{1/2})$ units, $(Me_2PhSiO_{1/2})$ units, $(MeF3PSiO_{2/2})$ units, and $(MeSiO_{3/2})$ units, polysiloxane made from $(Me_2ViSiO_{1/2})$ units, $(Me_2PhSiO_{1/2})$ units, $(MeF3PSiO_{2/2})$ units, and $(PhSiO_{3/2})$ units. Here, Me is a methyl group, Ph is a phenyl group, Vi is a vinyl group, and F3P is 3,3,3-trifluoropropyl group.

When component (B2) which will be described later has a fluorine atom-containing organic group, an alkenyl group containing organopolysiloxane without the fluorine atom-containing organic group can be used as component (B1). Examples of organopolysiloxane of component (B1) are shown by the average unit formula $R'_aSiO_{(4-a)/2}$, and include organopolysiloxane with at least an average of 2 alkenyl groups in one molecule. Each R' in the formula independently represent a substitution or an unsubstituted monovalent hydrocarbon, and as the monovalent hydrocarbon, examples include alkyl groups such as methyl groups, ethyl groups, propyl groups, butyl groups, pentyl groups, hexyl groups and the like, alkenyl groups such as vinyl groups, allyl groups, butenyl groups, pentenyl groups, hexenyl groups, heptenyl groups and the like, aryl groups such as phenyl groups, tolyl groups, xylyl groups and the like, and aralkyl groups such as benzyl groups, phenethyl groups and the like. However, R' with on average at least 2 in one molecule is an alkenyl group. Vinyl groups and hexenyl groups are preferable as the alkenyl group. Furthermore, the monovalent hydrocarbon group other than the alkenyl group is preferably a group selected from methyl groups and phenyl groups, and a methyl group is particularly preferable. In the formula, a is a number between 1.0 and 2.3. Examples of the molecular structure for component (B1) without these kinds of fluorine-containing organic group include linear shape, partially branched linear shape, branched chain shape, net shape, and branch shape. Component (B1) can be a mixture of two or more types of organopolysiloxanes having these molecular structures. In the average unit formula, a can be either such that 1≤a<2 or 2≤a<2.3. Furthermore, the viscosity of component (B1) at 25° C. is not restricted in particular, but the preferable range is between 100 to 1,000,000 mPa·s.

Specific examples of component (B1) without the fluorine atom-containing organic group include dimethylsiloxane-methylvinylsiloxane copolymer in which both ends of the molecular chain are blocked by trimethylsiloxy groups, methyl vinylpolysiloxane in which both ends of the molecular chain are blocked by trimethylsiloxy groups, methylvinylsiloxane-methylphenylsiloxane copolymer in which both ends of the molecular chain are blocked by trimethylsiloxy groups, dimethylsiloxane-methylvinylsiloxane-methylphenylsiloxane copolymer in which both ends of the molecular chain are blocked by trimethylsiloxy groups, dimethylpolysiloxane in which both ends of the molecular chain are blocked by dimethylvinylsiloxy groups, methyl vinylpolysiloxane in which both ends of the molecular chain are blocked by dimethylvinylsiloxy groups, methylphenylpolysiloxane in which both ends of the molecular chain are blocked by dimethylvinylsiloxy groups, dimethylsiloxane-methylvinylsiloxane copolymer in which both ends of the molecular chain are blocked by dimethylvinylsiloxy groups, methylvinylsiloxane-methylphenylsiloxane in which both ends of the molecular chain are blocked by dimethylvinylsiloxy groups, methylvinylsiloxane-diphenylsiloxane copolymer in which both ends of the molecular chain are blocked by dimethylvinylsiloxy groups, methyl vinylpolysiloxane in which one end of the molecular chain is blocked by a trimethylsiloxy group, and the other end of the molecular chain is blocked by a dimethylvinylsiloxy group, dimethylsiloxane-methylvinylsiloxane copolymer in which one end of the molecular chain is blocked by a trimethylsiloxy group and the other end of the molecular chain is blocked by a dimethylvinylsiloxane group, organopolysiloxane made from units of formula: $R'_3SiO_{1/2}$ and units of formula: $SiO_{4/2}$, organopolysiloxane made from units of formula: $R'SiO_{3/2}$, organopolysiloxane made from units of formula: $R'_2SiO_{2/2}$ and units of formula: $R'SiO_{3/2}$, organopolysiloxane made from units of formula: $R'_2SiO_{2/2}$, units of formula: $R'SiO_{3/2}$, and units of formula $SiO_{4/2}$, and a mixture of two or more types of the aforementioned organopolysiloxane. Note, each R' in the formula is independently a substituted or unsubstituted monovalent hydrocarbon group, and specific examples include groups similar to the aforementioned R'.

Component (B1) does not necessarily have the fluorine atom-containing organic group if component (B2) has a fluorine atom-containing organic group, but if component (B1) has a fluorine atom-containing organic group, the amount of fluorine atom-containing organic groups of all organic groups in one molecule is preferably 5 to 75 mol %, more preferably 10 to 70 mol %, and even more preferably 20 to 60 mol %. Note, the fluorine atom-containing organic group of component (B2) was described above as the fluorine atom-containing organic group included in the organopolysiloxane crosslinking reaction product that comprises the composite material.

Component (B1) of the present invention can normally be manufactured using known production methods, such as reactions including at least hydrolysis and condensation reaction or reactions including ring-opening polymerization using alkoxysilanes, chlorosilanes, or siloxanes having the fluorine atom-containing organic group, or a non-containing organic group, and/or the reactive functional group in the presence or absence of acids, base compounds, or both compounds. In particular, component (B1) having the fluorine atom-containing organic group can be manufactured using methods including at least hydrolysis and condensation reaction using the alkoxysilane having the fluorine atom-containing organic group as the raw material, or methods including the ring-opening polymerization reaction.

[Component (B2): Organopolysiloxane having the silicon atom bonded hydrogen atom]

Component (B2) is an organopolysiloxane having the silicon atom bonded hydrogen atom, and can have the fluorine atom-containing organic group, and component (B2) is preferably organopolysiloxane with at least an average of 2 silicon atom bonded hydrogen atoms in 1 molecule in order to have preferable cross-link reactivity. Note, if component (B1) has a fluorine-containing organic group, component (B2) can be an organopolysiloxane without a fluorine atom-containing organic group.

Types of silicon atom bonded hydrogen atoms other than the fluorine atom-containing organic groups and the silicon atom bonded hydrogen atoms in component (B2) are not restricted in particular, but specific examples of monovalent hydrocarbon groups include alkyl groups such as methyl groups, ethyl groups, propyl groups, butyl groups and the like; aryl groups such as phenyl groups, tolyl groups, xylyl groups and the like, and aralkyl groups and the like such as benzyl groups, phenethyl groups and the like. Silicon atom bonded organic groups other than fluorine atom-containing organic groups and alkenyl groups are groups selected from methyl groups and phenyl groups, and are preferably a methyl group, phenyl group, or a combination thereof. Furthermore, in addition to the aforementioned groups, the organopolysiloxane of component (B2) can have a small amount of a hydroxyl group or an alkoxy group. The fluorine atom-containing organic group of component (B2) was described above as the fluorine atom-containing organic group included in the organopolysiloxane crosslinking reaction product that comprises the composite material.

The molecular structure of component (B2) is not restricted in particular and can be any form including linear-shape, ring-shape, resinous, and partially branched resin-shape, and can have T units (in other words, $YSiO_{3/2}$, Y is a silicon atom bonded hydrogen atom, monovalent organic group (including the fluorine atom-containing organic group), hydroxyl group, or alkoxyl group), or Q units (in other words, $SiO_{4/2}$). Furthermore, the viscosity is not restricted in particular, and the viscosity at 25° C. measured using the B type viscometer in accordance with JISK 7117-1 is preferably within a range of 1 to 100,000 mPa·s due to ease of use.

Examples of particularly preferable organopolysiloxane as component (B2) include organopolysiloxane made from M units (in other words, $R^1{}_3SiO_{1/2}$) and T units ($R^1SiO_{3/2}$), linear organopolysiloxane made from M units and D units ($R^1{}_2SiO_{2/2}$), and resinous organopolysiloxane made from M units, D units, and T units or Q units. Examples of organopolysiloxane made from M units and T units include those where all or a portion of $R^1$ of the M unit are hydrogen atoms, and a portion or all of $R^1$ of the T unit are fluorine atom-containing organic groups, such as a 3,3,3-trifluoropropyl group. Examples of organopolysiloxane made from M units and D units include those where all or a portion of the $R^1$ of the M unit are hydrogen atoms, and all or a portion of the $R^1$ of the D unit are fluorine-containing organic groups, such as a 3,3,3-trifluoropropyl group. Examples of organopolysiloxane made from M units, D units, and T units include those where all or a portion of the R1 of the M unit are hydrogen atoms, all or a portion of the $R^1$ of the D units and T units are fluorine atom-containing organic groups, such as a 3,3,3-trifluoropropyl group.

Component (B2) is preferably expressed by the following formula:

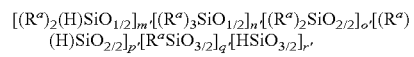

In the formula, H represents a hydrogen atom; and Ra independently represents a group selected from a group consisting of an organic group containing a fluorine atom and a monovalent hydrocarbon group. The organic group containing a fluorine atom and monovalent hydrocarbon group have already been described above in Component (B2). m, n, o, p, q, and r independently represent integers that are preferably selected such that the viscosity at 25° C. measured using a B type viscometer in accordance with JISK 7117-1 is preferably in a range of 100 to 100,000 mPa·s.

Specific examples of the organohydrogen polysiloxane of the component (B2) can include methyl hydrogen polysiloxane blocked on both ends of the molecular chain by trimethyl siloxy groups, methyl hydrogen siloxane-methyl (3,3,3-trifluoropropyl) siloxane copolymers blocked on both ends of the molecular chain by trimethyl siloxy groups, methyl hydrogen siloxane-dimethylsiloxane-methyl (3,3,3-trifluoropropyl) siloxane copolymers blocked on both ends of the molecular chain by trimethyl siloxy groups, dimethylsiloxane methyl hydrogen siloxane copolymers blocked on both ends of the molecular chain by trimethyl siloxy groups, dimethylsiloxane-methyl (3,3,3-trifluoropropyl) siloxane copolymers blocked on both ends of the molecular chain by dimethyl hydrogen siloxy groups, methyl (3,3,3-trifluoropropyl) polysiloxane blocked on both ends of the molecular chain by dimethyl hydrogen siloxy groups, methyl hydrogen siloxane-methyl (3,3,3-trifluoropropyl) siloxane copolymers blocked on both ends of the molecular chain by dimethyl hydrogen siloxy groups, methyl (perfluorobutyl ethyl) siloxane-methyl hydrogen siloxane copolymers blocked on both ends of the molecular chain by dimethyl hydrogen siloxy groups, methyl (perfluorobutyl ethyl) siloxane-dimethylsiloxane-methyl hydrogen siloxane copolymers blocked on both ends of the molecular chain by trimethyl siloxy groups, methyl (perfluorobutyl ethyl) siloxane-methyl hydrogen polysiloxane copolymers blocked on both ends of the molecular chain by trimethyl siloxy groups, polysiloxane containing a $(Me_3SiO_{1/2})$ unit, $(Me_2HSiO_{1/2})$ unit, and (F3PSiO_{3/2}) unit, polysiloxane containing a $(Me_3SiO_{1/2})$ unit, $(Me_2HSiO_{1/2})$ unit, $(PhSiO_{3/2})$ unit, and (F3PSiO_{3/2}) unit, polysiloxane containing a $(Me_2HSiO_{1/2})$ unit, $(MeSiO_{3/2})$ unit, and (F3PSiO_{3/2}) unit, polysiloxane containing a $(Me_2HSiO_{1/2})$ unit, $(PhSiO_{3/2})$ unit, and (F3PSiO_{3/2}) unit, polysiloxane containing a $(Me_2HSiO_{1/2})$ unit and (F3PSiO_{3/2}) unit, polysiloxane containing a $(Me_3SiO_{1/2})$ unit, $(Me_2HSiO_{1/2})$ unit, $(MeSiO_{3/2})$ unit, and (F3PSiO_{3/2}) unit, polysiloxane containing a $(Me_2HSiO_{1/2})$ unit, $(MeSiO_{3/2})$ unit, and (F3PSiO_{3/2}) unit, polysiloxane containing a $(Me_2HSiO_{1/2})$ unit, $(Me_2PhSiO_{1/2})$ unit, (Me- $SiO_{3/2}$) unit, and (F3P$SiO_{3/2}$) unit, polysiloxane containing a (Me$_2$HSi$O_{1/2}$) unit, (Me$_2$Ph$SiO_{1/2}$) unit, (Ph$SiO_{3/2}$) unit, and (F3P$SiO_{3/2}$) unit, polysiloxane containing a (Me$_2$HSi$O_{1/2}$) unit, (Me$SiO_{3/2}$) unit, (Ph$SiO_{3/2}$) unit, and (F3P$SiO_{3/2}$) unit, polysiloxane containing a (Me$_2$HSi$O_{1/2}$) unit, (Me$_2$Ph$SiO_{1/2}$) unit, and (F3P$SiO_{3/2}$) unit, polysiloxane containing a (Me$_2$HSi$O_{1/2}$) unit, (Me$_2$Si$O_{2/2}$) unit, and (F3P$SiO_{3/2}$) unit, polysiloxane containing a (Me$_2$HSi$O_{1/2}$) unit, (MePh$SiO_{2/2}$) unit, and (F3P$SiO_{3/2}$) unit, polysiloxane containing a (Me$_2$HSi$O_{1/2}$) unit, (Me$_2$Si$O_{2/2}$) unit, (Ph$SiO_{3/2}$) unit, and (F3P$SiO_{3/2}$) unit, polysiloxane containing a (Me$_2$HSi$O_{1/2}$) unit (MePh$SiO_{2/2}$) unit, (Ph$SiO_{3/2}$) unit, and (F3P$SiO_{3/2}$) unit, polysiloxane containing a (Me$_2$HSi$O_{1/2}$) unit, (Me$_2$Si$O_{2/2}$) unit, (Me$SiO_{3/2}$) unit, and (F3P$SiO_{3/2}$) unit, polysiloxane containing a (MePhHSi$O_{1/2}$) unit, (Me$_2$Si$O_{2/2}$) unit, and (F3P$SiO_{3/2}$) unit, polysiloxane containing a (MePhHSi$O_{1/2}$) unit, (Me$_2$Si$O_{2/2}$) unit, (Ph$SiO_{3/2}$) unit, and (F3P$SiO_{3/2}$) unit, polysiloxane containing a (MePhHSi$O_{1/2}$) unit, (MePh$SiO_{2/2}$) unit, and (F3P$SiO_{3/2}$) unit, polysiloxane containing a (MePhHSi$O_{1/2}$) unit, (MePh$SiO_{2/2}$) unit, (Ph$SiO_{3/2}$) unit, and (F3P$SiO_{3/2}$) unit, polysiloxane containing a (Me$_2$HSi$O_{1/2}$) unit, (MeF3P$SiO_{2/2}$) unit, and (Me$SiO_{3/2}$) unit, polysiloxane containing a (Me$_2$HSi$O_{1/2}$) unit, (Me$_2$Si$O_{2/2}$) unit, (MeF3P$SiO_{2/2}$) unit, and (Me$SiO_{3/2}$) unit, polysiloxane containing a (Me$_2$HSi$O_{1/2}$) unit, (MeF3P$SiO_{2/2}$) unit, and (Ph$SiO_{3/2}$) unit, polysiloxane containing a (Me$_2$HSi$O_{1/2}$) unit, (Me$_3$Si$O_{1/2}$) unit, (MeF3P$SiO_{2/2}$) unit, and (Me$SiO_{3/2}$) unit, polysiloxane containing a (Me$_2$HSi$O_{1/2}$) unit, (Me$_3$Si$O_{1/2}$) unit, (MeF3P$SiO_{2/2}$) unit, and (Ph$SiO_{3/2}$) unit, polysiloxane containing a (Me$_2$HSi$O_{1/2}$) unit, (Me$_2$Ph$SiO_{1/2}$) unit, (MeF3P$SiO_{2/2}$) unit, and (Me$SiO_{3/2}$) unit, polysiloxane containing a (Me$_2$HSi$O_{1/2}$) unit, (Me$_2$Ph$SiO_{1/2}$) unit, (MeF3P$SiO_{2/2}$) unit, and (Ph$SiO_{3/2}$) unit, polysiloxane containing a (Me$_2$HSi$O_{1/2}$) unit, (F3P$SiO_{3/2}$) unit, and (Si$O_{4/2}$) unit, polysiloxane containing a (Me$_2$HSi$O_{1/2}$) unit and (Si$O_{4/2}$) unit, polysiloxane containing a (Me$_2$HSi$O_{1/2}$) unit, (Me$_3$Si$O_{1/2}$) unit, and (Si$O_{4/2}$) unit, polysiloxane containing a (Me$_2$HSi$O_{1/2}$) unit, (Me$_2$Si$O_{2/2}$) unit, and (Si$O_{4/2}$) unit, and polysiloxane containing a (Me$_2$HSi$O_{1/2}$) unit, (MePFBE$SiO_{2/2}$) unit, and (Si$O_{4/2}$) unit. Herein, Me represents a methyl group, Ph represents a phenyl group, F3P represents a 3,3,3-trifluoropropyl group, and PFBE represents a perfluorobutyl ethyl group.

Component (B2) does not necessarily have the fluorine atom-containing organic group if component (B1) has a fluorine atom-containing organic group, but if component (B2) has a fluorine atom-containing organic group, the amount of fluorine atom-containing organic groups of all organic groups in one molecule is preferably 5 to 75 mol %, more preferably 10 to 70 mol %, and even more preferably 20 to 60 mol %.

Component (B2) can normally be manufactured using known production methods, such as reactions including at least hydrolysis and condensation reaction or reactions including ring-opening polymerization using alkoxysilanes, chlorosilanes, or siloxanes having the fluorine atom-containing organic group, or a non-containing organic group, and/or the reactive functional group in the presence or absence of acids, base compounds, or both compounds. In particular, component (B2) having the fluorine atom-containing organic group can be manufactured using methods including at least hydrolysis and condensation reaction using the alkoxysilane having the fluorine atom-containing organic group as the raw material, or methods including the ring-opening polymerization reaction.

[SiH/Vi Ratio]

The organopolysiloxane crosslinking reaction product (B) of the present invention is preferably obtained by a hydrosilylation reaction of the components (B1) and (B2). In the crosslinking reaction product, the compounding ratio of the components (B1) and (B2) in a crosslinking reactive composition is preferably such that compounding ratio (molar ratio) (SiH/Vi) of a silicon-bonded hydrogen atom (H) in the component (B2) and alkenyl group (Vi) in the component (B1) is within a range of 0.5 to 5.0, and particularly preferably within a range of 0.5 to 3.0. If the value departs from the aforementioned range, residual functional groups after a crosslinking reaction by the hydrosilylation reaction may adversely affect the physical properties of the composite material, which may lead to reducing the transparency of the composite material due to the component (A) and component (B) separating, as well as deteriorating the dispersion condition between the components (A) and (B) in the composite material.

The crosslinking reactive organopolysiloxane composition (B') used in precursor composition of the composite material of the present invention or in a method of manufacturing the composite material of the present invention preferably contains the component (B1), component (B2), and a hydrosilylation reaction catalyst described later, and the compounding ratio of the component (B1) and component (B2) is preferably such that the compounding ratio (molar ratio) of a silicon-bonded hydrogen atom (H) in the component (B2) and an alkenyl group (Vi) in the component (B1) is within the aforementioned range.

Component (D): Hydrosilylation Reaction Catalyst

If the organopolysiloxane crosslinking reaction product of the component (B) is a composition that is crosslinked by a hydrosilylation reaction, the components (B1) and (B2) are preferably crosslinking reacted by a hydrosilylation reaction catalyst.

A hydrosilylation reaction catalyst that can be used in the present invention is not particularly restricted so long as a hydrosilylation reaction can be promoted. Various metals and compounds are known thus far as a hydrosilylation reaction catalyst, and a catalyst can be appropriately selection therefrom and used in the present invention. Specific examples of the hydrosilylation reaction product can include fine particulate platinum adsorbed on a silica fine powder or carbon powder carrier, chloroplatinic acid, alcohol-modified chloroplatinic acid, an olefin complex of chloroplatinic acid, a coordinate compound of chloroplatinic acid and vinylsiloxane, platinum black, palladium, and a rhodium catalyst. In the organopolysiloxane crosslinking reaction product of the present invention, the hydrosilylation reaction catalyst is preferably platinum or a compound containing platinum.

The amount of the hydrosilylation catalyst used is not restricted to a predetermined amount so long as the amount can promote a hydrosilylation reaction between the components (B1) and (B2). In general, if a platinum catalyst is used, the platinum catalyst is used at an amount where the amount of platinum metal included in the platinum catalyst is within a range of 0.01 to 1,000 ppm, and preferably 0.1 to 500 ppm of the total amount of the components (B1) and (B2).

Composite Material of Fluoropolymer-Fluorine-Containing Organopolysiloxane

The composite material according to the present invention contains the component (A) and component (B) within a range where the mass ratio is 99/1 to 60/40, and is uniformly dispersed or dispersed in a gradational manner in a condition where the component (A) and component (B) cannot be separated from each other. A composite form of the fluoropolymer and a dissimilar polymer such as organopolysiloxane cannot be achieved by a conventionally known polymer blending method, and in the composite material of the present invention, the component (A) and component (B) are integrated by dispersing with regard to a mutual polymer to the extent that transparency is substantially provided. A composite form of the dissimilar polymer can be achieved by such as crosslinking reacting the crosslinking reactive organopolysiloxane composition (B') which is a precursor composition of the component (B) in the presence of the component (A), which is a method of manufacturing the composite material described later, but on the other hand, even if the organopolysiloxane crosslinking reaction product after crosslinking reacting is dispersed in the component (A) by means such as pulverizing by a mechanical force or the like, both components is not sufficiently mixed, which may lead to an insufficient composite or a significant reduction in transparency based on separation thereof.

In the composite material of the present invention, the quality of composite formation of the component (A) and component (B) can be confirmed by whether or not the transmittance of visible light of a film is a value which can be said to be substantially transparent if a film with a specific thickness is formed. The composite material of the present invention is preferably formed into a composite such that the components (A) and (B) have favorable transparency, and "substantially transparent" specifically means that the transmittance of light with a wavelength of 450 nm of a film sample with a thickness of 70 µm, containing only the component (A) and component (B) is a transmittance of 70% or higher, and more preferably a transmittance of 80% or higher if the value of air is set to 100%. "Sample containing only components (A) and (B)" refers to a sample containing only components (A) and (B) in the same ratio as the composite material without containing component (X), for the case where the composite material contains component (X) in addition to components (A) and (B). Note that the transmittance of the composite material according to the present invention may be 82% or higher, 85% or higher, or 87% or higher.

In the aforementioned composite form, either one of the component (A) or component (B) is dispersed into the other in a mutually inseparable manner, a phase separation between both components or any polymer is not precipitated on a surface of the composite material or within a phase in a rough particle form, and thus the entire composite material is substantially transparent. Note that the dispersed condition of the component (A) and component (B) with regard the other may be a uniformly dispersed form where the component (A) and component (B) are integrated in a mutually inseparable manner and the concentration of the components in a dispersed phase is uniform, throughout the entire composite material, or a gradationally dispersed form where the component (A) and component (B) are integrated in a mutually inseparable manner, and the concentration of the components in a dispersed phase has a gradient with regard to an arbitrary direction (in a film form, either a planar direction or cross sectional direction) of the composite material.

In the composite material of the present invention, the component (A) and component (B) are integrated in a mutually inseparable manner as described above, where precipitation or separation does not occur over a long period of time, or component (A) and/or component (B) precipitation or change in the phase separation condition of both components is not very likely to occur, but on the other hand, the component (A) and component (B) maintain to some extent crystallinity, mechanical properties deriving therefrom, piezoelectricity, and other electrical properties, and the like in the composite material, as individual polymers. Therefore, while maintaining to a certain extent crystallinity of the polymer (A) containing fluorine and physical properties deriving therefrom, such as piezoelectricity and other properties, a composite material with a lower elastic modulus, in other words, a higher flexibility than the fluoropolymer itself can be achieved by forming a composite with the organopolysiloxane crosslinking reaction product (B). Note that whether or not physical properties derived from a crystal component of the polymer (A) containing fluorine itself are essentially maintained in the composite material can be confirmed by having similar thermal properties (endothermic profile of differential scanning calorimetry or the like). For example, confirmation is possible if the difference (ΔT) between the crystal melting peak temperature of the composite material ($T_{hyb}$) and the crystal melting peak temperatures ($T_A$) of component (A) itself measured by the same method is within a range of ±5° C., and the difference (ΔT) is preferably within a range of ±3° C. or ±2° C. Similarly, the composite material of the present invention preferably has a degree of crystallinity as measured by the DSC within a range of ±10%, ±5%, or ±3% as compared to the degree of crystallinity of the component (A) alone.

The characteristics of the composite material of the present invention can be specified by the integrity of both components derived from a favorable dispersed condition of the component (A) and component (B) as described above (in other words, the components (A) and (B) are integrated in an inseparable manner in the composite material of the present invention, separating the component (A) and component (B) is difficult by normal physical means such as peeling, cutting, pulverizing, or the like the composite material, and an integral and inseparable composite material is formed), and preferably by favorable transparency. Furthermore, in the composite material, the crystal component of the polymer (A) containing fluorine is maintained in essentially the same condition as an individual condition. For example, the crystal components can be confirmed by the difference in the crystal melting peak temperature of the component (A) alone and the crystal melting peak temperature of the composite material is in the aforementioned range within ±5° C. Furthermore, the composite material of the present invention may contain (X) a filler or other additive other than the aforementioned component (A) and component (B), as an optional component. Even with a composite material containing these optional components, a case where a composite polymer material containing only the component (A) and component (B) without the optional component (X) satisfies the conditions of the composite material of the present invention is included within the scope of the present invention. In other words, in a case where the composite material according to the present invention contains the component (A), component (B), and optional component (X), if the composite material essentially containing only the component (A) and component (B) without the optional component (X) provides characteristics of the present invention, a composite material further containing the optional component (X) is also included within the scope of the composite material of the present invention.

In other words, the composite material of the present invention contains the component (A), component (B), and optionally (X) a filler or other additive other than the component (A) and component (B), the components (A) and (B) are included such that the mass ratio ((A)/(B)) of the component (A) and component (B) are within a range of 99/1 to 60/40, and a film sample with a thickness of 70 μm containing only the component (A) and component (B) without the optional component (X) is preferably substantially transparent. More specifically, the transmittance of light with a wavelength of 450 nm of a film sample with a thickness of 70 μm, containing only the component (A) and component (B) is 70% or higher, 80% or higher, 82% or higher, 85% or higher, or 87% or higher, if the value of air is set to 100%.

The composite material of the present invention can be identified by one of the component (A) or component (B) being uniformly dispersed or dispersed in a gradational manner in a condition where the components are integral and mutually inseparable, regardless of whether or not the optional component (X) is used or the type or amount thereof.

Other Optional Components (X): Filler or Other Additives

Another additive may be added as the optional component (X) if necessary in addition to the components described above such as components (A) and (B) and the like to the composite material of the present invention, and examples of the additive can include one or more types of additives selected from fillers, insulation improving materials, releasability improving additives (=releasing agents), and additives normally added to an organopolysiloxane composition. These additives may be added to curable organopolysiloxane which is the component (B), and then formed into a composite with the component (A), or may be added to a system containing the component (A) and the crosslinking reactive organopolysiloxane composition (B') before crosslinking reacting, and then mixed into the entire body. For example, a curing retardant (curing inhibitor), flame retardant, heat resisting agent, coloring agent, and other optional additives can be added to the composite material. If the component (B) is the organopolysiloxane crosslinking reaction product formed by crosslinking by a hydrosilylation reaction, a curing retardant (curing inhibitor) may be used to control the storage stability and/or crosslinking rate of the precursor composition, and examples of the curing retardant include: 2-methyl-3-butyne-2-ol, 3,5-dimethyl-1-hexyne-3-ol, 2-phenyl-3-butyne-2-ol, and other alkyl alcohols; 3-methyl-3-penten-1-yne, 3,5-dimethyl-3-hexene-1-yne, and other enyne compounds; and benzotriazole, but are not restricted thereto. The amount of the curing retardant (curing inhibitor) used is preferably within a range of 1 to 50,000 ppm by mass unit with regard to the component (B).

Filler

A filler may or may not be used if desired. If a filler is used, either one or both of an inorganic filler or organic filler can be used. The type of the used filler is not particularly restricted. Examples include high dielectric fillers, conductive fillers, insulating fillers, and reinforcing fillers, and one or more types thereof can be used. In particular, one or more types of fillers selected from a group consisting of high dielectric fillers, conductive fillers, insulating fillers, and reinforcing fillers can be included in the composite material of the present invention. A portion of or the entire filler may be surface treated by one or more types of surface treating agents.

The type of the filler is not particularly restricted, and one type may be used individually, or two or more types may be used in combination.

The shape of the filler is not particularly restricted, and a particulate shape, plate shape, needle shape, fibrous shape, and other arbitrary shape can be used. If the shape of the filler is particulate, the particle size of the filler is not restricted, and the volume average particle size if measured by a laser light diffraction method can be within a range of 0.001 to 500 μm for example. Furthermore, depending on the intended use of the filler, the volume average particle size of the filler can be 300 μm or less, 200 μm or less, 100 μm or less, and 10 μm or less, or 0.01 μm or more, and 0.1 μm or more, and 1 μm or more. When the shape of the filler is anisotropic such as plate shaped, needle shaped, fibrous shaped, or the like, the aspect ratio of the filler can be 1.5 or more, 5 or more, or 10 or more. When fine particles with a volume average particle size of 0.01 μm or less, and maximum particle size of 0.02 μm or less are used, a composite material with a substantially high transparency can be manufactured.

Typical examples of inorganic fillers (inorganic particles or fillers) can include metal oxides (fine powder silica (anhydride), white carbon (hydrated compound), and other silica, alumina, titania, zirconia, titanium oxide, iron oxide, strontrium oxide, cerium oxide, zinc oxide, and the like), metal hydroxides (aluminum hydroxide and the like), metal salts (sulfate, calcium carbonate, and other carbonates; calcium phosphate, titanium phosphate, and other phosphates; mica, calcium silicate, bentonite, zeolite, maifan stone, talc, montmorillonite, and other silicates; calcium tungstate and other tungstates; barium titanate, potassium titanate, aluminum titanate, strontium titanate, and other titanates, and the like), metal nitrides (silicon nitride, boron nitride, aluminum nitride, titanium nitride, and the like), metal carbides (silicon carbide, boron carbide, titanium carbide, tungsten carbide, and the like), metal boride (titanium boride, zirconium boride, and the like), metals (gold, platinum, palladium, and the like), carbon (such as carbon black, graphite, fullerene, and carbon nanotube), and the like. The inorganic filler may be fibrous (such as glass fibers, carbon fibers, metal fibers, and whiskers) or the like, but is preferably powdery. The inorganic filler may be a ferromagnetic body: such as iron, cobalt, nickel, and other ferromagnetic metal (powder); magnetite, ferrite, and other ferromagnetic alloy (powder); magnetic iron oxide and other ferromagnetic metal oxide (powder); and the like.

A coloring agent such as a pigment [inorganic coloring agent (inorganic pigment)] may also be included in the inorganic filler. The coloring agent may be an achromatic color or a chromatic color (yellow, orange, red, purple, blue, green, and the like).

The inorganic filler may have various functions such as ultraviolet absorbing properties (or shielding properties) or the like. Titanium oxide, zinc oxide, or other metal oxide (or metal oxide particles) is included in the representative inorganic filler.

Typical examples of the organic filler (organic particles or filler) include silicone resin fillers, fluorine resin fillers, polybutadiene resin fillers, and the like. Examples of the silicone resin filler can include "Torayfil" manufactured by Dow Corning Toray Co., Ltd., "SPM" manufactured by Wacker Asahikasei Silicone Co., Ltd., and the like.

From the perspective of function, the aforementioned filler which may be used in the present invention can be selected from a group consisting of high dielectric fillers, conductive fillers, insulating fillers, reinforcing fillers, thermally conductive fillers, and mixtures thereof. The filler which may be used in the present invention may be a filler belonging to only 1 of these categories, or 2 or more fillers belonging to 2 or more categories may be used. Note that commercially available products or the like of the functional fillers can be used without particular restrictions if desired.

A portion or all of the fillers (regardless of particle size, function, and the like) used in the present invention may be surface treated by one or more types of surface treating agents. The type of surface treatment may be hydrophilizing treatment or hydrophobizing treatment without particular limitation, but hydrophobizing treatment is preferred. When a hydrophobized filler is used, the filler may be dispersible at a high filling rate into the crosslinking reactive organopolysiloxane composition or composite material, and increase in viscosity of the composition will be suppressed, and molding processability will improve.

The surface treatment can be performed by treating (or coating) the filler using a surface treating agent. Examples of the surface treating agent for hydrophobizing include organotitanium compounds, organosilicon compounds, organozirconium compounds, organoaluminum compounds, and organophosphorus compounds, and at least one type of surface treating agent selected therefrom can be used. The surface treating agent may be used independently or in a combination of two or more. With regard to the mass of the entire filler, the ratio of the used surface treating agent can be within a range of 0.3 to 12 mass % or 0.5 to 8 mass % for example. Note that the ratio of the used surface treating agent is a ratio based on the content of the filler and treating agent, and excess treating agent is preferably removed after surface treating.

The added amount of the filler in the composite material of the present invention is not particularly restricted, and the filler can be 1 to 500 mass parts, 2 to 2000 mass parts, or 5 to 500 mass parts with regards to 100 mass parts of the total amount of the component (A) and component (B) for example.

Insulation Improving Agent

The composite material of the present invention may further contain at least one type of insulation improving agent. The type of the insulation improving agent is not particularly restricted, and one type may be used individually, or two or more types may be used in combination. Furthermore, the insulation improving agent may be treated by the aforementioned surface treating method if necessary. The insulation improving agents which are additives for improving insulation breakdown properties improve the insulation breakdown strength of the obtained composite material, and particularly a film shaped composite material.

The insulation improving agent is preferably an electrical insulation improving agent. Thereby, the insulation breakdown properties of the composite material can be improved.

The insulation improving agent is not particularly restricted, and can be selected from a group consisting of aluminum silicate, aluminum sulfate, aluminum hydroxide, magnesium hydroxide, baked clay, montmorillonite, hydrotalcite, talc, and mixtures thereof.

The added amount of the insulation improving agent in the composite material of the present invention is not particularly restricted, and can be 0.001 to 20 mass parts, 0.01 to 10 mass parts, or 0.1 to 5 mass parts with regards to 100 mass parts of the total amount of the component (A) and component (B) for example.

Releasability Improving Additive (=Releasing Agent)

The composite material of the present invention may further contain at least one type of releasing agent. When the releasability of the composite material is inferior when forming a thin film or the like, and particularly if the composite material is molded into a film shape at a high speed, the film may be damaged when the composite material is separated from a mold. However, by adding a releasing agent to the composite material, an advantage is provided where the manufacturing rate of the film can be improved without damaging the obtained film. The additive improves the releasability of the film, and one type may be used independently, or two or more types may be used in combination.

Examples of a usable releasability improving additive (=releasing agent) include carboxylic acid releasing agents, ester releasing agents, ether releasing agent, ketone releasing agents, alcohol releasing agents, fluorine releasing agents, and the like. Such release agents may be used alone as a single type or may be used as a combination of two or more types. Furthermore, a releasing agent that does not contain a silicon atom, a releasing agent that contains a silicon atom, or a mixture thereof can be used.

The added amount of the releasability improving additive is not particularly restricted, and is preferably within a range of 0.1 mass % or more and 30 mass % or less with regard to the entire obtained composite material.

Shape of Composite Material

The composite material of the present invention is preferably used after molding into a sheet shape or film shape based on electrical and optical properties and mechanical properties thereof. The method of molding the composite material according to the present invention into a film shape is not particularly restricted, and examples can include: a method of coating a film by applying a precursor composition of the composite material described later onto a substrate using a conventionally known applying method; a method of molding through an extruder providing a slot with a predetermined shape; and the like.

The thickness of the film shaped composite material can be within a range of 0.1 µm to 5000 µm for example. Note that as described above, for the composite material of the present invention, the transmittance of light with a wavelength of 450 nm of the composite material if a film sample with a film thickness of 70 µm is used is preferably 70% or higher, and more preferably 80% or higher. Furthermore, it goes without saying that the composite material of the present invention can be molded into a film with an arbitrary predetermined thickness.

The film shaped composite material may be used in one layer, two or more of the film shaped composite material of the present invention with the same or different compositions may be combined and overlayingly used.

Application of Composite Material

The composite material of the present invention is useful as an electronic material, member for a display device, or member for a transducer (including for sensors, speakers, actuators, and generators), and a suitable application of the composite material is a member for an electronic part or display device. In particular, the film shaped composite material is suitable as a display panel or member for a display, and is particularly useful in a so-called touch panel application that can operate an instrument, and particularly an electronic instrument by contacting a screen with a fingertip or the like. Note that the composite material of the present invention has excellent uniformity and physical properties, and therefore, can be applied in places in which transparency is not required.

Precursor Composition of Composite Material of Fluoropolymer-Fluorine-Containing Organopolysiloxane The composite material of the present invention can be manufactured by two methods, namely, a method using an organic catalyst and a method that does not essentially use an organic catalyst, but can be particularly suitably manufactured using the following precursor composition containing a specific catalyst (C).

A preferred precursor composition of the composite material of the present invention contains:

(A) one or more fluoropolymers selected from the group consisting of polyvinylidene fluoride and polyvinylidene fluoride-based copolymer;

(B') an organopolysiloxane composition capable of crosslinking reaction, comprising a reactive organopolysiloxane which has, in the molecule, a fluorine-containing organic group(s) and one or more types of reactive functional groups, and are capable of intermolecular-crosslinking by the reaction of the reactive functional groups;

(C) an organic solvent which is capable of solubilizing at least a part of or the entirety of each of a component (A) and a component (B'); and (X) if necessary as an optional component, a filler or other additive other than the component (A) and component (B), where the mass ratio ((A)/(B)) between the component (A) and organopolysiloxane crosslinking reaction product (B) obtained by crosslinking reacting the component (B') is 99/1 to 60/40.

The component (A), crosslinking reactive organopolysiloxane composition (B'), and optional component (X), which are components of the precursor composition are as described above.

[Component (C)]

Component (C) is an organic solvent that can dissolve at least a part or all of both component (A) and component (B'), and any one or a combination of two or more types of organic solvents with this characteristic can be used. By using a precursor composition containing the solvent, a composite material of the present invention can be suitably produced. Note that when using component (C), all of component (A) and component (B') are preferably dissolved into component (C), but at least a part of component (A) and component (B') must be dissolved into component (C).

A polar solvent is preferable as the organic solvent of component (C). Preferable examples of the solvent that can be used as component (C) can include one or more polar solvents selected from the group consisting of N,N-dimethylformamide, N,N-dimethylacetamide, N-methyl-2-pyrrolidone, dimethylsulfoxide, hexamethylphosphate triamide, tetramethylurea, triethylphosphate, and trimethylphosphate. Of the solvents, preferable solvents are N,N-dimethylformamide, N,N-dimethylacetamide, and N-methyl-2-pyrrolidone.

The precursor component of the composite material of the present invention can be obtained by mixing one or more types of fluoropolymers (component (A)) selected from a group of polyvinylidene fluoride and polyvinylidene fluoride copolymers, a crosslink reactive organopolysiloxane composition (component (B')) containing a reactive organopolysiloxane that contains a fluorine atom-containing organic group and one or more types of reactive functional groups in the molecule, and that can crosslink between molecules by the reaction of the reactive functional groups, and the organic solvent (component (C)) that dissolves at least a part or all of the components (A) and (B'), and dissolving a part or a whole of component (A) and (B') in the organic solvent.

In particular, if the cross-link reactive organopolysiloxane composition is an organopolysiloxane composition that can cross-link by a hydrosilylation reaction, the precursor composition includes the aforementioned (B1) organopolysiloxane with an alkenyl group and (B2) organopolysiloxane with a silicon atom bonded hydrogen atom, and at least one or both of component (B1) and component (B2) is an organopolysiloxane with a fluorine atom-containing organic group, and the composition preferably contains a hydrosilylation reaction catalyst.

Note that, as described above, in the precursor composition of the composite material of the present invention, the crosslinking reactive organopolysiloxane composition (component (B')) or the entire composition can contain any filler or other additives (X).

The amount of components in the precursor composition of the composite material of the present invention, specific components, specific examples, and the like are as described above.

Production method of Composite Material of Fluoropolymer-Fluorine-Containing Organopolysiloxane The composite material of the present invention can be manufactured by two methods, namely, a method using an organic catalyst and a method that does not essentially use an organic catalyst. Particularly, the method that uses the organic solvent is preferable. A production method of the composite material is described below.

When using the organic solvent of component (C), the production method of the composite material of the present invention can be performed by a solution method. On the other hand, a crosslinking reaction of reactive organopolysiloxane of component (B') can be performed while using a single or twin screw extruder and the like and directly mechanically mixing component (A) and component B', instead of using component (C).

When using component (C), all of component (A) and component (B') are preferably dissolved into component (C), but the production method of the composite material of the present invention can be performed with at least a part of component (A) and component (B') dissolved into component (C).

When using component (C), mixing one or more types of fluoropolymers (component (A)) selected from a group of polyvinylidene fluoride and polyvinylidene fluoride copolymers, a crosslinking reactive organopolysiloxane composition (component (B')) containing a reactive organopolysiloxane that contains a fluorine atom-containing organic group and one or more types of reactive functional groups in the molecule, and can crosslink between molecules by the reaction of the reactive functional groups, the organic solvent (component (C)) that dissolves at least a part or all of the components (A) and (B'), and further as any selective component in certain cases, mixing a filler other than component (A) and component (B) or other additives ((component (X)) are performed to dissolve a part or a whole of component (A) and (B') into the organic solvent (component (C)). Herein, the order of mixing component (A), (B'), (X) and (C) are not particularly restricted, and mixing can be performed in any order. For example, a method of mixing component (B') and component (X), mixing with component (C), then mixing with component (A) is also included as the method of the present invention. Note that If the crosslinking reactive organopolysiloxane composition that is the component (B') is a composition that is crosslinked by a hydrosilylation reaction, (D) hydrosilylation reaction catalyst, from the viewpoint of control of the crosslinking reaction, is preferably added at the end.

Herein, the combined amount of component (A) and component (B') is an amount within a range wherein the mass ratio ((A)/(B)) with the organopolysiloxane made by the crosslinking reaction of component (A) and component (B') is 99/1 to 60/40.

As the crosslinking reactive organopolysiloxane composition that is component (B'), as described above, a composition that can be crosslinked by a known crosslinking method of organopolysiloxane is used. As a crosslinking method, as described above, crosslinking by hydrosilylation reaction is most preferable, and examples also include peroxide crosslinking, condensation reaction crosslinking, addition reaction crosslinking, and UV crosslinking. In other words, any crosslinking method can be used as long as uncrosslinked organopolysiloxane can be crosslinked after mixing with fluoropolymers. The crosslinking methods, the reactive functional group that is contained in organopolysiloxane required for crosslinking, and additives required for crosslinking are well known.

For example, if peroxide crosslinking, organic peroxide, for example, alkyl peroxide (for example, di-tert-butyl peroxide), acyl peroxide (for example, benzoyl peroxide), or the like can be used as an initiator for crosslinking. In the case of peroxide crosslinking, the reactive functional group of organopolysiloxane can be a group selected from silicon atom-bonded methyl group, silicon atom-bonded vinyl group, and the like. If using condensation reaction crosslinking type organopolysiloxane, an organopolysiloxane containing a reactive group and fluorine atom-containing organic group selected from known condensation curing types such as dealcoholation type, deacetylation type, deoximation type, deamidation type, dehydroxylamination type, deacetonation type, and the like can be used as a reactive organopolysiloxane, and if required, a condensation catalyst, for example, a known condensation reaction catalyst such as a tin compound, titanium compound, fatty acid metal salt, amino group-containing compound, and the like can be further used. An ultraviolet crosslinking type organopolysiloxane can be used as the reactive organopolysiloxane, and in the case, if required, high energy rays such as ultraviolet rays can be irradiated in the presence of a photosensitizer to the organopolysiloxane bonded with an acrylic functional group, acrylamide functional group, or epoxy functional group to crosslink the organopolysiloxane.

Preferably, an organopolysiloxane that can be crosslinked by addition reaction is preferably used for the crosslinking reactive organopolysiloxane that is component (B'), and particularly, using a crosslinking reactive organopolysiloxane composition containing an organopolysiloxane that can be crosslinked by addition reaction by hydrosilylation reaction is preferable. The composition preferably contains the component (B1), component (B2), and hydrosilylation reaction catalyst, and the types and combined amount are as described above.

Therefore, in the production method of the composite material of the present invention, polyvinylidene fluoride and component (A) that is selected from a group made of polyvinylidene fluoride copolymer, particularly the component (B1) and (2) and the crosslinking reactive organopolysiloxane composition (B') containing the hydrosilylation catalyst is mixed with the aforementioned organic solvent (component (C)), and at least a part or all of component (A) and component (B') are dissolved in the organic solvent to obtain the mixture. Herein, all of component (A) and (B') are not required to be dissolved in the organic solvent, but all of the components are preferably dissolved. Note that as an optional component, a filler or other additives ((component (X)) can be further added to the composition.

Next, the reactive functional group of component (B') is reacted in the mixture containing component (A), component (B'), and component (C) that is an organic catalyst, crosslinking reaction of component (B') is performed, organopolysiloxane crosslinking reaction product (B) containing fluorine atom-containing organic group in the molecules is formed, and is composite formed with component (A). If required, crosslinking reaction can be accelerated by heating the mixture. At least a part or all of the organic solvent used can be removed before the crosslinking reaction, simultaneously with the crosslinking reaction, and/or after the crosslinking reaction. The method of removing the organic solvent is not particularly restricted, but an example of the simplest method is to heat the mixture as required under reduced pressure to remove the organic solvent. At this time, the mixture can be heated to accelerate the crosslinking reaction of component (B') while proceeding with the removal of the organic solvent. The extent of removing the organic solvent can be arbitrarily set according to the purpose, but generally, the organic solvent is preferably removed so that the organic solvent remaining in the obtained composite material is as little as possible.

If component (C), which is the organic solvent, is used in the production method of the composite material of the present invention, a solution obtained by dissolving component (A) and component (B) in component (C) is preferably made to have sufficient fluidity by using component (C) within a range of 25 to 3000 mass parts, with regard to a total of 100 mass parts of component (A) and component (B), which is formed by a cross-linking reaction of component (B'). By using the solution with sufficient fluidity and using a known method such as a casting method, a film made of the composite material of the present invention can be easily prepared.

As a method for obtaining the composite material by performing a crosslinking reaction of component (B') in the presence of component (A) without using the organic solvent, an example includes a method of mechanically mixing component (A) and component (B') and heating as required. Specifically, an example includes a method of mixing component (A) and component (B') in a single or twin screw extruder, and molding the extruded mixture and further heating to advance a crosslinking reaction of component (B') to obtain the composite material. The method includes a process of a curing reaction of a curable organopolysiloxane composition (B') containing a reactive organopolysiloxane, which contains one or more types of reactive functional groups in the molecule in the presence of one or more types of fluoropolymers (A) selected from a group of polyvinylidene fluoride and polyvinylidene fluoride copolymers, and can crosslink between molecules by the reaction of the reactive functional groups. As the crosslinking reactive organopolysiloxane composition of component (B') used in the method, using a curable organopolysiloxane composition containing a combination of component (B1) and component (B2) wherein the reactive functional group is a combination of a silicon-bonded hydrogen atom and an alkenyl group, and a hydrosilylation reaction catalyst is preferable.

component (A) and component (B) (component (B) contains an organopolysiloxane crosslinking reaction product by hydrosilylation reaction of a composition containing a combination of component (B1) and (B2)) can be used at an arbitrary ratio as long as a composite material with the desired properties can be obtained, but generally, the mass of component (A): the mass of component (B) is preferably 99:1 through 60:40, and is more preferable to obtain a composite material that is transparent with no or extremely little haze. Note that, regarding the mass ratio of the component (A) and component (B), the volume ratio of component (A) and (B) is designed so that component (A) is in excess (51 parts or more). Herein, the volume ratio is a ratio based on a value of the volume at 25° C. which was calculated by dividing each mass value by a specific gravity, based on a specific gravity measured individually at 25° C.

Composite Material Obtained by the Production Method

The fluoropolymer-fluorine-containing organopolysiloxane composite material that is obtained by manufacturing using the production method of the present invention is a composite formation of different polymers made by mixing the fluoropolymer of component (A) with the crosslink-reactive organopolysiloxane composition which is the pre-crosslinked component (B').

In contrast, in a polyhedral silsesquioxane oligomer (POSS) containing a fluorine-containing organic group, or in a fluoropolymer-fluorine-containing organopolysiloxane composite material that contains POSS which was later crosslinked, which are described or suggested in U.S. Pat. No. 7,193,015 Specifications or U.S. Pat. No. 7,553,904 Specifications, even if POSS is later crosslinked, a production method of blending a pre-synthesized POSS to form the composite is used. In contrast, the production method of the present invention is different from the known method because instead of POSS, the organopolysiloxane crosslinking reaction product is unified to a composite formation with the fluoropolymer at a specific mass ratio, and forming the fluorine-containing organopolysiloxane crosslinking reaction product is performed after mixing with the fluoropolymer. Particularly, by crosslinking component (B') while component (A) and (B) are dissolved by using the organic solvent (C) that can solubilize component (A) and (B), in a manner wherein the fluoropolymer (A) and the fluorine-containing organopolysiloxane crosslinking reaction product (B) are mutually inseparable, a manner of composite formation can be achieved, wherein component (B) in component (A), or component (A) in component (B), is homogeneously dispersed or skewedly dispersed. Therefore, the fluoropolymer - fluorine-containing organopolysiloxane composite material that was manufactured using the method of the present invention, and the composite material described in the U.S. Patent Specifications are not the same, and a person with ordinary skill in the art cannot easily conceive the composite material of the present invention or the production method thereof based on the description in the U.S. Patent Specification.

In the fluoropolymer-fluorine-containing organopolysiloxane composite material that was manufactured using the production method of the present invention, either one of the component (A) or component (B) is dispersed into the other or mutually dispersed in a mutually inseparable manner, a phase separation between both components or any polymer is not precipitated on a surface of the composite material or within a phase in a rough particle form, and thus the entire composite material is substantially transparent. More specifically, in the composite material that was manufactured using the production method of the present invention, the transmittance of light with a wavelength of 450 nm of a film sample with a thickness of 70 μm, containing only the component (A) and component (B) is 80% or higher, 82% or higher, 85% or higher, or 87% or higher, if the value of air is set to 100%. Note that it goes without saying that by using the production method of the present invention, a composite material containing other optional components (X) in addition to component (A) and (B) can be achieved, and a composite material with a form other than a film sample with a thickness of 70 μm can also be achieved. Furthermore, the composite material containing the optional components (X) achieved by the production method, and the composite material in a form other than a film with a thickness of 70 μm, are included in the scope of the present invention.

In the fluoropolymer-fluorine-containing organopolysiloxane composite material that was manufactured using the production method of the present invention, as described in the examples below, for example, the difference (ΔT) of a crystal melting peak temperature ($T_{hyb}$) of the composite material and a crystal melting peak temperature ($T_A$) of the component (A) independently measured using the same method is in a range of ±5° C. or less, ±3° C. or less, or ±2° C. or less. In other words, in the composite material of the present invention, crystallinity and thermal properties of the fluoropolymer is considered to indicate maintaining most of the crystallinity and thermal properties of the fluoropolymer before forming the composite with fluorine-containing organopolysiloxane, therefore meaning that a composite material with lower elastic modulus and higher flexibility than the fluoropolymer can be manufactured by the production method of the present invention, while maintaining to some extent, crystallinity, thermal properties, and physical properties derived from those properties, for example, piezoelectricity or the like.

The fluoropolymer-fluorine containing organopolysiloxane composite material that was manufactured using the method of the present invention can be molded into a film form. In particular, if manufacturing the composite material of the present invention from a precursor composition for the composite material of the present invention, the composite material with the film shape can be extremely easily achieved. Specifically, the composite material with the film shape can be manufactured by applying the solution containing component (A), (B'), (C), and in some cases, the optional (X), onto a suitable substrate by a casting method or the like, then performing crosslinking reaction of component (B') while removing the solvent. With the crosslinking reaction of component (B') and removing the solvent, the crosslinking reaction can be proceeded first, then the solvent can be removed after the reaction has partially or completely proceeded, or the solvent can be partially or completely removed first, then the reaction can be proceeded, or removing the solvent and proceeding the reaction can be performed simultaneously, or any other possible order can be performed. However, the method of manufacturing the film shaped composite material is not restricted to the method described here, and a different method can be used.

INDUSTRIAL APPLICABILITY

The fluoropolymer-fluorine-containing organopolysiloxane composite material that was manufactured by the method of the present invention, particularly the film shaped composite material is suitable for using in a display panel, for example, a touch panel.

EXAMPLES

The present invention is described based on the examples, but the present invention is not restricted to the following examples.

The compounds below were used in the examples described below.

1. Component (A): Poly(vinylidene fluoride-co-hexafluoropropylene) PVDF-HFP (Aldrich)
2. Component (B1): $m^{Vi}T^{F3Pr}_{3.24}$ (manufactured by Dow Corning Corporation, Mw=1.51×10³)
3. Component (B2-1): $M^{H}_{1.3}T^{F3Pr}$ (manufactured by Dow Corning Corporation, Mw=1.11×10³)
4. Component (B2-2): $M^{H}D^{F3Pr}_{10}M^{H}$ (manufactured by Dow Corning Corporation)

5. Component (C): N, N-dimethylformamide (Wako Pure Chemical Industries, Ltd.)
6. Component (D): Isopropanol solution of platinum - divinyltetramethyldisiloxane complex (approximately 0.045 wt % of platinum concentration) (manufactured by Dow Corning Corporation)

In the formula of component (B1), component (B2-1), and component (B2-2), $M^{Vi}$ represents $(CH_3)_2(Vi)SiO_{1/2}$ group (in the formula, Vi represents a vinyl group), $T^{F3Pr}$ represents (3,3,3-trifluoropropyl) $SiO_{3/2}$ group, MH represents $(CH_3)_2(H)SiO_{1/2}$ group, and $D^{F3Pr}$ represents (3,3,3-trifluoropropyl) $(CH_3)SiO_{2/2}$ group. In the following example, components (B1) and (B2-1) or (B2-2) are used in an amount such that the amount of silicon atom bonded hydrogen atoms (Si—H) of component (B2-1) and component (B2-2) is 1.2 to 1.3 mol, with regard to 1 mol of the vinyl group of component (B1). Incidentally, the weight average molecular weight of component (B1) and component (B2-1) refers to the weight average molecular weight calculated as polystyrene measured using GPC (gel permeation chromatography) using tetrahydrofuran (THF) as the solvent.

Measurement Method of Composition Analysis of the Achieved Composite Material

1. Elemental Analysis

The analysis of elements that configure the composite material is performed using a fluorescent X-ray elemental analyzer (Axios, manufactured by PANalytical).

2. Thermomechanical Property Analysis

A film composite material was prepared, and a sample piece with a thickness in a range of 70 to 100 μm, a width of 4 mm, and a length of 20 mm was prepared. A thermomechanical measuring instrument (manufactured by Hitachi High-Tech Science Corporation, stress/strain control TMA device TMASS 7100) was used to measure the storage elastic modulus of the sample piece. The measurement was performed by cooling the test piece from 20° C. to −60° C. at a rate of 10° C. per minute, maintaining the test piece at −60° C. for 10 minutes, then measuring the storage elastic modulus of the test piece at 30° C.

3. Measurement of Degree of Crystallinity and Crystal Melting Peak Temperature of the Composite Material A differential scanning calorimeter (manufactured by SII NanoTechnology Inc., differential scanning calorimeter X-DSC7000) was used to measure the degree of crystallinity and crystal melting peak temperature of the composite material. The degree of crystallinity and crystal melting peak temperature is considered to be the value indicated by the fluoropolymer in the composite material. The measurement was performed using a circular sample (mass of approximately 10 mg) with a diameter of 4 mm which was cut out from the film sample with a thickness of 70 to 100 μm. The sample was cooled from 30° C. to 60° C. at a rate of 10° C. per minute, the sample was maintained at −60° C. for 10 minutes, then the temperature was increased at a rate of 10° C. per minute to 230° C. From the heat of melting of the crystals obtained, the degree of crystallinity and crystal melting peak temperature of the fluoropolymer in the composite material was measured. The value of the degree of crystallinity was determined from the ratio of the melting heat quantity of the composite material by setting the melting heat quantity of a complete crystal of the fluoropolymer as 104.6 J/g 4. Measurement of Transparency The transmissivity of the composite material was measured using a Spectrophotometer CM-5 produced by Konica Minolta. The measurement value of the transmissivity at a wavelength of 450 nm was used as the value for the transmissivity. The transmissivity measurement was performed on a film-shaped composite material with a thickness of approximately 70 μm, and is shown as a relative value based on transmissivity of air being 100%.

Practical Example 1

1.7 g of component (A) was dissolved in 7.7 g of component (C) at a temperature of 40° C. or lower in a glass vial equipped with a magnetic stirrer, and then the solution was mixed for 2 hours or longer at room temperature. Subsequently, 0.04 g of component (B1) was added to the solution, and the mixture was mixed for 5 minutes. Subsequently, 0.016 g of component (B2) was also added to the mixture, and the mixture was mixed for 5 minutes. Finally, 0.018 g of component (D) was added to the obtained mixture and mixed for 2 hours. Approximately 1.5 g of the colorless clear solution that was obtained was transferred to an aluminum cup with a diameter of approximately 6 cm, a hydrosilylation reaction was performed between component (B1) and component (B2) by heating to 40° C. in a vacuum for 2 hours, and then heating at 65° C. for 1 hour, and then removing component (C) to obtain a transparent film composite material. The composition of the components used in the test, the fluorescent x-ray silicon peak intensity, the elasticity E' when stored at 30° C., the melting point, and the degree of crystallization are shown in Table 1.

Working Examples 2 to 5

Test samples of the composite material were fabricated similar to working example 1, except that components (A) through (D) were used in the amounts shown in Table 1, and the aforementioned measurements were taken.

Practical Example 6

Test samples of the composite material were fabricated similar to working example 1, except that components (A) through (D) were used in the amounts shown in Table 1, and mixing was performed for 15 min. after adding component (D), and then the aforementioned measurements were taken.

Comparative Example 1

A sample was fabricated similar to working example 1, except that component (A) and component (C) were used in the amounts shown in Table 1.

Comparative Example 2

Test samples of the composite material were fabricated similar to working example 4, except that components (B2) and (D) were excluded, and the aforementioned measurements were taken. With this comparative example, the composite material that was obtained included a fluoropolymer and an organopolysiloxane with a fluorine atom-containing organic group, and in this system were systems where the organopolysiloxane did not undergo a cross-linking reaction.

The test results are shown below in Table 1.

TABLE 1

|  | Practical Example | | | | | | Comparative Examples | |
| --- | --- | --- | --- | --- | --- | --- | --- | --- |
|  | 1 | 2 | 3 | 4 | 5 | 6 | 1 | 2 |
| Component (A) | 1.70 | 1.71 | 0.85 | 0.86 | 0.86 | 0.85 | 0.86 | 0.86 |
| Component (C) | 7.65 | 7.65 | 4.00 | 4.00 | 4.00 | 4.03 | 4.00 | 4.00 |
| Component (B1) | 0.040 | 0.083 | 0.095 | 0.156 | 0.246 | 0.023 |  | 0.156 |
| Component (B2-1) | 0.016 | 0.032 | 0.037 | 0.062 | 0.092 |  |  |  |
| Component (B2-2) |  |  |  |  |  | 0.041 |  |  |
| Component (D) | 0.018 | 0.038 | 0.040 | 0.072 | 0.111 | 0.025 |  |  |
| Silicon peak intensity | 18.2 | 35.5 | 61.7 | 115.9 | 223.3 | 30.1 | — | An oily component bled out from the film test sample, and thus the sample was not suitable for use as a film |
| Elasticity E' during storage at 30° C. (GPa) | 0.49 | 0.46 | 0.44 | 0.37 | 0.31 | 0.35 | 0.50 | |
| Degree of crystallization | 49.31 | 48.57 | 48.57 | 48.60 | 48.02 | 48.80 | 48.93 | |
| Crystal melting peak temperature (° C.) | 140.78 | 140.64 | 141.44 | 137.42 | 137.16 | 138.59 | 136.14 | |
| Transmissivity (%) | 87 | 82 | 82 | 85 | 82 | 75 | 86 | |

Based on the results in Table 1, there was not a major difference between the degree of crystallization and Crystal melting temperature of the polymer all comparative example 1 where a fluorine-containing organopolysiloxane was not added to the poly (vinylidene fluoride-co-hexafluoro propylene). Furthermore, the composite materials of working examples 1 through 6 all had high transmissivity of 70% or higher, and as the ratio of components (B1), (B2-1), and (B2-2) increased with regard to component (A), the flexibility on the composite material was found to increase, based on the value for the 30° C. storage elongation E'. In particular, when more units of disiloxane as indicated by the (3,3,3-trifluoropropyl)(CH3) SiO$_{2/2}$ groups were included, as with component (B2-2), the flexibility of the composite material could be designed even higher.

The invention claimed is:

1. A fluoropolymer/fluorine-containing organopolysiloxane composite material, the composite material comprising:
   (A) one or more fluoropolymers selected from a group consisting of polyvinylidene fluoride and polyvinylidene fluoride-based copolymer;
   (B) a cross-linked organopolysiloxane having a fluorine atom-containing organic group, the cross-linked organopolysiloxane being a cross-linked reaction product of a reactive organopolysiloxane having a fluorine atom-containing organic group, containing in its molecular structure a T siloxy unit, represented by XSiO$_{3/2}$, where X is a monovalent organic group, a fluorine atom-containing organic group, a hydroxyl group, or an alkoxyl group, and having one or more reactive functional groups, which is capable of intermolecular-cross-linking by the reaction of the reactive functional groups; and optionally,
   (X) a filler or an additive other than component (A) and component (B);
   wherein component (A) and component (B) are present in a ratio ((A)/(B)) by weight of from 99/1 to 60/40.

2. The composite material according to claim 1, wherein component (A) and component (B) are uniformly dispersed or gradationally dispersed over the entirety of the composite material such that one cannot be separated from the other.

3. The composite material according to claim 1, wherein a test sample with a thickness of 70 μm and containing only component (A) and component (B) and that does not contain the optional component (X), is essentially transparent.

4. The composite material according to claim 1, wherein component (B) is a cross-linked reaction product formed by conducting a cross-linking reaction of an organopolysiloxane composition which is cross-linkable by a hydrosilylation reaction, where the organopolysiloxane composition comprises an organopolysiloxane containing alkenyl groups (B1), an organopolysiloxane containing silicon atom-bonded hydrogen atoms (B2), and a hydrosilylation catalyst.

5. The composite material according to claim 1, wherein 10 to 90mol % of the organic groups of component (B) are fluorine atom-containing organic groups.

6. The composite material according to claim 1, wherein component (B) has a fluoroalkyl group as the fluorine atom-containing organic group.

7. The composite material according to claim 1, wherein the difference (ΔT) between a crystal-melt peak temperature (T$_{hyb}$) of the composite material, which is measured by using a differential scanning calorimetry, and a crystal-melt peak temperature (T$_A$) of component (A) alone measured by using the same method, is within the range of ±5° C.

8. The composite material according to claim 1, having a film shape.

9. A precursor composition for the fluoropolymer/fluorine-containing organopolysiloxane composite material according to claim 1, the precursor composition comprising:
   (A) the one or more fluoropolymers selected from a group consisting of polyvinylidene fluoride and polyvinylidene fluoride-based copolymer;
   (B') an organopolysiloxane composition capable of a cross-linking reaction to form component (B), wherein component (B') comprises the reactive organopolysiloxane having a fluorine atom-containing organic group, containing in its molecular structure a T siloxy unit, represented by XSiO$_{3/2}$, where X is a monovalent organic group, a fluorine atom-containing organic group, a hydroxyl group, or an alkoxyl group, and having one or more reactive functional groups, which is capable of intermolecular-crosslinking by the reaction of the reactive functional groups;
   (C) an organic solvent which is capable of solubilizing at least a part or the entirety of each of component (A) and component (B'); and optionally, (X) the filler or additive other than component (A) and component (B');

wherein component (A) and component (B') are present in such a ratio that the ratio ((A)/(B)) by weight of component (A) and component (B) formed by conducting a cross-linking reaction of component (B') is within the range of from 99/1 to 60/40.

10. The precursor composition according to claim 9, wherein an amount of component (C) is within the range of from 25 to 3,000 parts by mass relative to 100 parts by mass of the sum of component (A) and component (B').

11. A method of producing the fluoropolymer/fluorine-containing organopolysiloxane composite material according to claim 1, the production method comprising:

(1) mixing
(A) the one or more fluoropolymers selected from the group consisting of polyvinylidene fluoride and polyvinylidene fluoride-based copolymer;
(B') an organopolysiloxane composition capable of a cross-linking reaction to form component (B), wherein component (B') comprises the reactive organopolysiloxane having a fluorine atom-containing organic group, containing in its molecular structure a T siloxy unit, represented by $XSiO_{3/2}$, where X is a monovalent organic group, a fluorine atom-containing organic group, a hydroxyl group, or an alkoxyl group, and having one or more reactive functional groups, which is capable of intermolecular-cross-linking by the reaction of the reactive functional groups; and
(C) an organic solvent which is capable of solubilizing at least a part or the entirety of each of component (A) and component (B');
in such a ratio that the ratio ((A)/(B)) by weight of component (A) and component (B) formed by conducting a cross-linking reaction of component (B') is within the range of from 99/1 to 60/40; and (2) removing at least a part or the entirety of component (C) together with or after reacting the reactive functional groups of component (B') in the mixture prepared in step (1) to form component (B) which has fluorine atom-containing organic groups in the molecule.

12. The production method according to claim 11, wherein component (B') contains an organopolysiloxane having an alkenyl group (B1), an organopolysiloxane having a silicon atom-bonded hydrogen atom (B2), and a hydrosilylation reaction catalyst, and wherein at least one or both of component (B1) and component (B2) has a fluorine atom-containing organic group.

13. The production method according to claim 11, wherein component (C) includes one or more polar solvents selected from N,N-dimethylformamide, N,N-dimethylacetamide, N-methyl-2-pyrrolidone, 1,3-dimethylimidazolidinone, dimethylsulfoxide, hexamethylphosphate triamide, tetramethylurea, triethylphosphate, and trimethylphosphate.

14. The production method according to claim 11, wherein step (1) further comprises mixing component (X) in addition to component (A), component (B'), and component (C).

15. The production method according to claim 11, wherein the amount of component (C) used is within the range of from 25 to 3,000 parts by mass relative to 100 parts by mass of the sum of component (A) and component (B').

16. A member for a display device or electronic material, the member comprising the composite material according to claim 1.

17. An electronic component or display device, comprising the member according to claim 16.

18. A display panel or display, comprising a member containing the composite material according to claim 8.

19. The composite material according to claim 1, wherein component (B) has a plurality of T siloxy units and each X is individually selected from the group consisting of a fluorine atom-containing organic group, a hydroxyl group, and an alkoxyl group.

20. The composite material according to claim 19, wherein at least a portion of the T siloxy units have the fluorine atom-containing organic group as X.

* * * * *